United States Patent [19]
Kawai et al.

[11] Patent Number: 6,137,485
[45] Date of Patent: *Oct. 24, 2000

[54] IMAGE TRANSMISSION METHOD AND APPARATUS, AND IMAGE TRANSMISSION SYSTEM INCLUDING THE APPARATUS

[75] Inventors: Tomoaki Kawai; Takashi Oya, both of Yokohama; Shinya Urisaka, Kashiwa; Takeshi Namikata, Yokohama, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/616,704

[22] Filed: Mar. 15, 1996

[30] Foreign Application Priority Data

Mar. 20, 1995 [JP] Japan ................................. 7-061059
Jul. 21, 1995 [JP] Japan ................................. 7-185449

[51] Int. Cl.[7] ........................................... H04N 7/14
[52] U.S. Cl. .............................. 345/327; 348/211; 348/15
[58] Field of Search ............................ 348/15, 16, 14, 348/211, 13, 143, 212, 213, 214; 370/260; 395/200.34; 345/377; H04N 7/14

[56] References Cited

U.S. PATENT DOCUMENTS

| | | | |
|---|---|---|---|
| 4,650,929 | 3/1987 | Boerger et al. | 348/15 |
| 5,218,627 | 6/1993 | Corey et al. | 348/16 |
| 5,577,107 | 11/1996 | Inagaki | 348/15 |
| 5,625,410 | 4/1997 | Washino et al. | 348/154 |
| 5,737,011 | 4/1998 | Lukacs | 348/15 |

*Primary Examiner*—Nathan Flynn
*Attorney, Agent, or Firm*—Morgan & Finnegan, LLP

[57] ABSTRACT

Image transmission method and apparatus for transmitting/receiving images among a plurality of terminals connected to a network, and an image transmission system including the apparatus. A video camera (30) is connected to each of a plurality of video communication terminals connected to a network (12), and an image picked up by the camera (30) of each terminal is exchanged with another communication terminal via the network (12). In this case, in a certain terminal, a plurality of images received from other terminals are displayed on a display (26), and the names of terminals which are receiving the image picked up by the video camera (30) of the terminal, and the name of a terminal (or the name of an operator) which is operating the video camera (30) of the terminal are also displayed on the display (26). Each terminal displays, on the display (26), an icon which allows an operator to recognize at a glance whether or not an image picked up by the camera of its own terminal is being monitored by another terminal, or generates a warning tone in correspondence with the monitor or operation state of the video camera (30) of its own terminal, thereby calling for an attention of the operator of its own terminal.

41 Claims, 20 Drawing Sheets

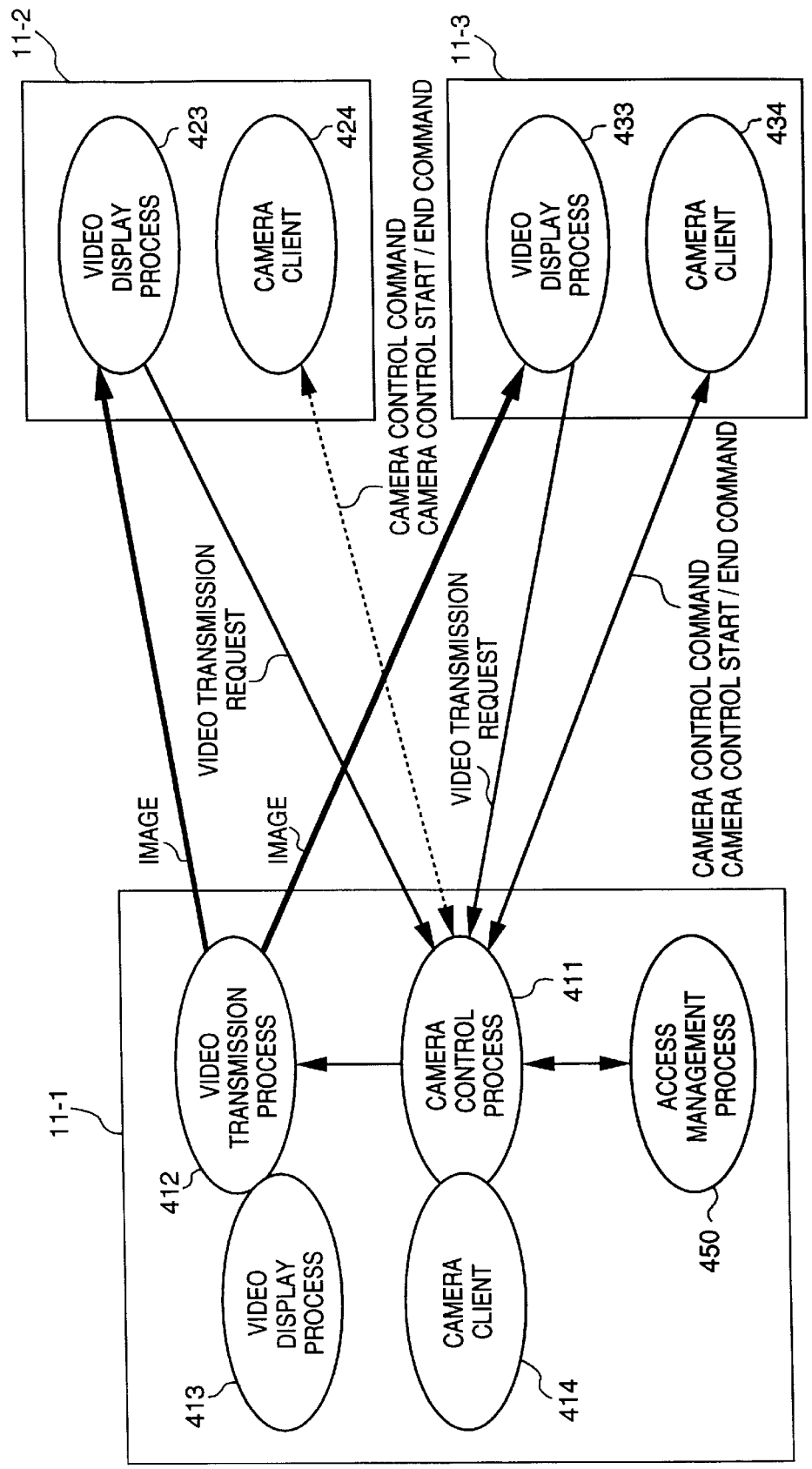

| USER NAME | ACCESS HOST |
|---|---|
| person1 | host1 |
| person2 | host2 |
| person3 | host3 |
| ... | ... |

FIG. 19A 12-1 VIDEO TRANSMISSION START REQUEST

| CAMERA UNIT NUMBER | VIDEO TRANSMISSION | START | HOST ADDRESS | USER NAME |

191

FIG. 19B 12-2 VIDEO TRANSMISSION END REQUEST

| CAMERA UNIT NUMBER | VIDEO TRANSMISSION | END | HOST ADDRESS |

192

FIG. 19C 12-3 CAMERA CONTROL COMMAND

| CAMERA UNIT NUMBER | CAMERA CONTROL | TYPE OF CONTROL | PARAMETER |

193

FIG. 19D 12-4 CAMERA CONTROL START REQUEST

| CAMERA UNIT NUMBER | CAMERA CONTROL | START | USER NAME |

194

FIG. 19E 12-5 CAMERA CONTROL END REQUEST

| CAMERA UNIT NUMBER | CAMERA CONTROL | END |

195

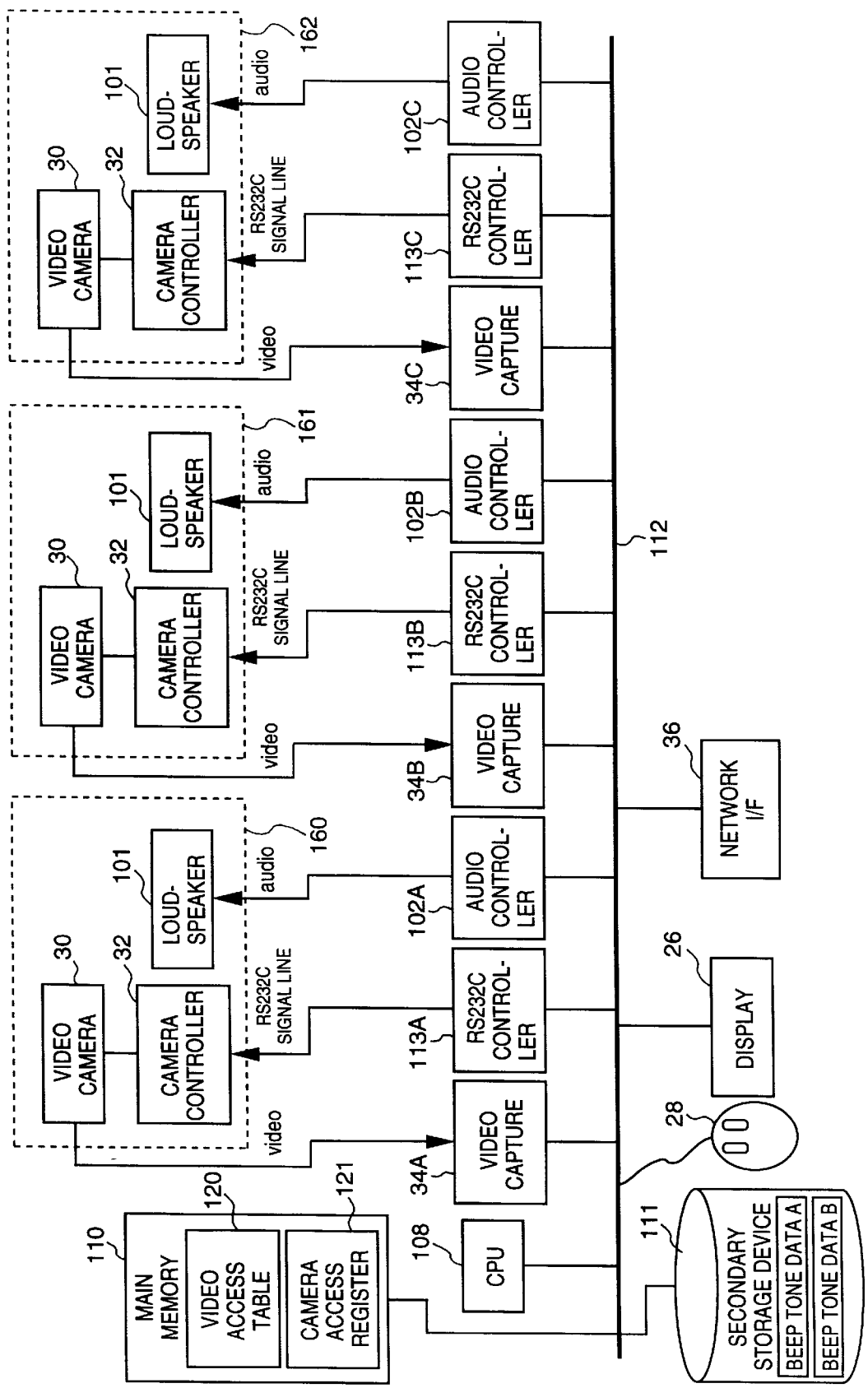

IMAGE TRANSMISSION METHOD AND APPARATUS, AND IMAGE TRANSMISSION SYSTEM INCLUDING THE APPARATUS

BACKGROUND OF THE INVENTION

The present invention relates to an image transmission method and apparatus for transmitting an image via a network, and an image transmission system including the apparatus.

An apparatus in which a video camera is connected to a computer equipment, and an image picked up by the video camera is input to the computer equipment has been developed. Also, an image transmission system for transmitting the image input via the video camera to a remote place via a public communication line or a computer network is known. For example, typical applications of such system are a television meeting or conference system and a video mailing system. In the television meeting system, an output image from a video camera is input to a computer equipment, and the image is exchanged via the network. During the meeting, the image is exchanged between a predetermined source and destination.

On the other hand, an image transmission system which exchanges images input from a plurality of video cameras provided in a large number of places to allow transmission of the image showing the state of a remote place is known. In this system, some specific ones of the plurality of video cameras are selected, their images are acquired via a network, and the acquired images are displayed on a monitor screen. This image transmission system is different from the above-mentioned television meeting system in that an image is not always exchanged between a predetermined source and destination. More specifically, in this image transmission system, a user arbitrary selects an image from a video camera that he or she wants to observe, and observes the selected image displayed on the monitor screen.

In such system, since a video camera connected to a computer equipment connected to a network can be remote-controlled via the network, the video camera connected to the computer equipment may be remote-controlled without the knowledge of the owner (or manager) of the computer equipment, and an image picked up by the camera may be willfully observed by a third party, thus violating the privacy of the owner (or manager). Such a problem tends to occur more often when the computer equipment is connected to an open computer network.

The owner (or manager) of the camera cannot prevent an image from being inadvertently observed by a third party since the prior art has no means for confirming who is observing an image picked up by his or her camera.

SUMMARY OF THE INVENTION

The present invention has been made in consideration of the above-mentioned prior art, and has as its object to provide an image transmission method and apparatus, with which the operator can easily confirm the transmission destination of an image picked up by a camera connected to his or her terminal, and an image transmission system including the apparatus.

It is another object of the present invention to provide an image transmission method and apparatus, which can freely limit the transmission destination of an image, and an image transmission system including the apparatus.

It is still another object of the present invention to provide an image transmission method and apparatus, with which the operator of a terminal can easily confirm whether or not an image picked up by a camera connected to his or her terminal is being observed by another terminal via a network since his or her terminal generates a warning at that time, and an image transmission system including the apparatus.

It is still another object of the present invention to provide an image transmission method and apparatus, with which the operator can easily confirm another terminal that is controlling the operation of a camera connected to his or her terminal, and an image transmission system including the apparatus.

It is still another object of the present invention to provide an image transmission method and apparatus, with which when a camera connected to his or her terminal is being controlled, the operator can easily confirm the type of control since he or she can receive information corresponding to the type of control, and an image transmission system including the apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principle of the invention.

FIG. 11 is a chart for explaining processes in a video communication terminal of the second embodiment;

FIG. 14 is a schematic diagram showing an example of a video access table to the camera in the second embodiment;

FIGS. 19A to 19E show the data formats of request packets in the fifth embodiment; and FIG. 20 is a schematic block diagram showing the arrangement of an image transmission system according to the sixth embodiment of the present invention.

DESCRIPTION OF THE PREFERRED EMBODIMENTS

The preferred embodiments of the present invention will be described in detail hereinafter with reference to the accompanying drawings.

[First Embodiment]

Figure 1:
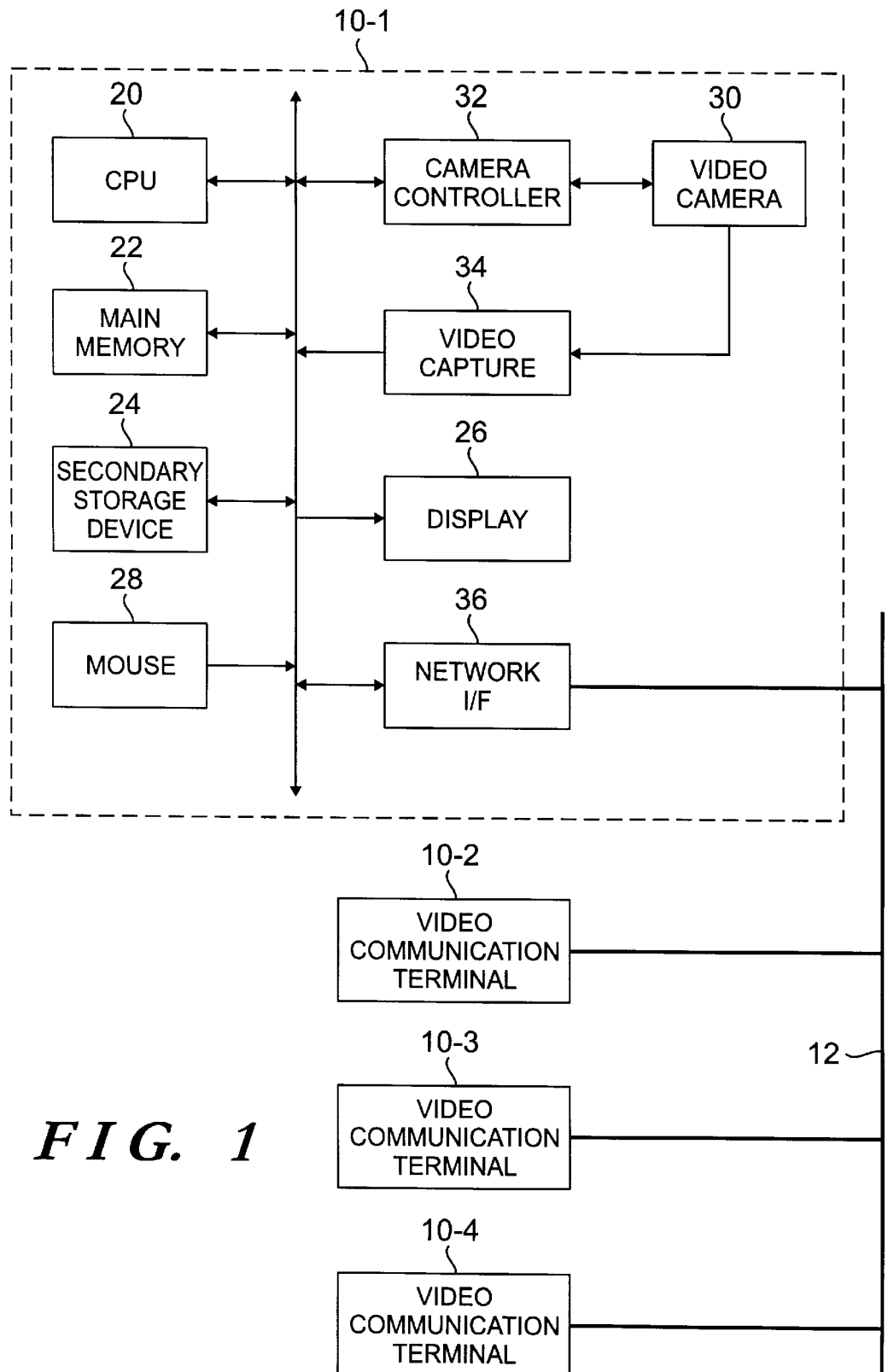
FIG. 1 is a schematic block diagram showing the arrangement of an image transmission system according to the first embodiment of the present invention.

FIG. 1 is a schematic block diagram showing the arrangement of an image transmission system according to the first embodiment of the present invention.

Referring to FIG. 1, reference numerals 10-1, 10-2, 10-3, 10-4, . . . Denote video communication terminals, which are connected to a network 12 and transmit/receive images. These terminals have the same arrangement. More specifically, each of the video communication terminals 10-1, 10-2, 10-3, and 10-4 comprises a CPU 20, a main memory 22, a secondary storage device 24 (e.g., a hard disk device), a bit map display 26 (to be simply referred to as a display hereinafter), a mouse 28 serving as a pointing device, a video camera 30, a camera controller 32 for directly controlling the video camera 30 in accordance with camera control commands such as pan, tilt, zoom, focus commands, and the like, a video capture 34 for capturing a video signal output from the video camera 30, and a network interface (I/F) 36 for connecting the communication terminal to the network 12. The CPU 20, the main memory 22, the secondary storage device 24, the display 26, the mouse 28, the camera controller 32, the video capture 34, and the network I/F 36 are connected to an internal bus 38.

A video signal output from the video camera 30 is A/D-converted by the video capture 34, and is then converted into digital video data of a predetermined format. The converted video data is transmitted onto the network 12 via the network I/F 36. In this case, a multi cast communication or broadcast communication is used to simultaneously transmit the video data to a plurality of points. The camera controller 32 can be controlled by a communication terminal at a remote place via the network 12. In the first embodiment, general purpose workstations are used as the video communication terminals 10-1, 10-2, 10-3, and 10-4. Note that FIG. 1 illustrates only four video communication terminals. However, the present invention is not limited to this, and a larger number of communication terminals may be connected.

Figure 2:
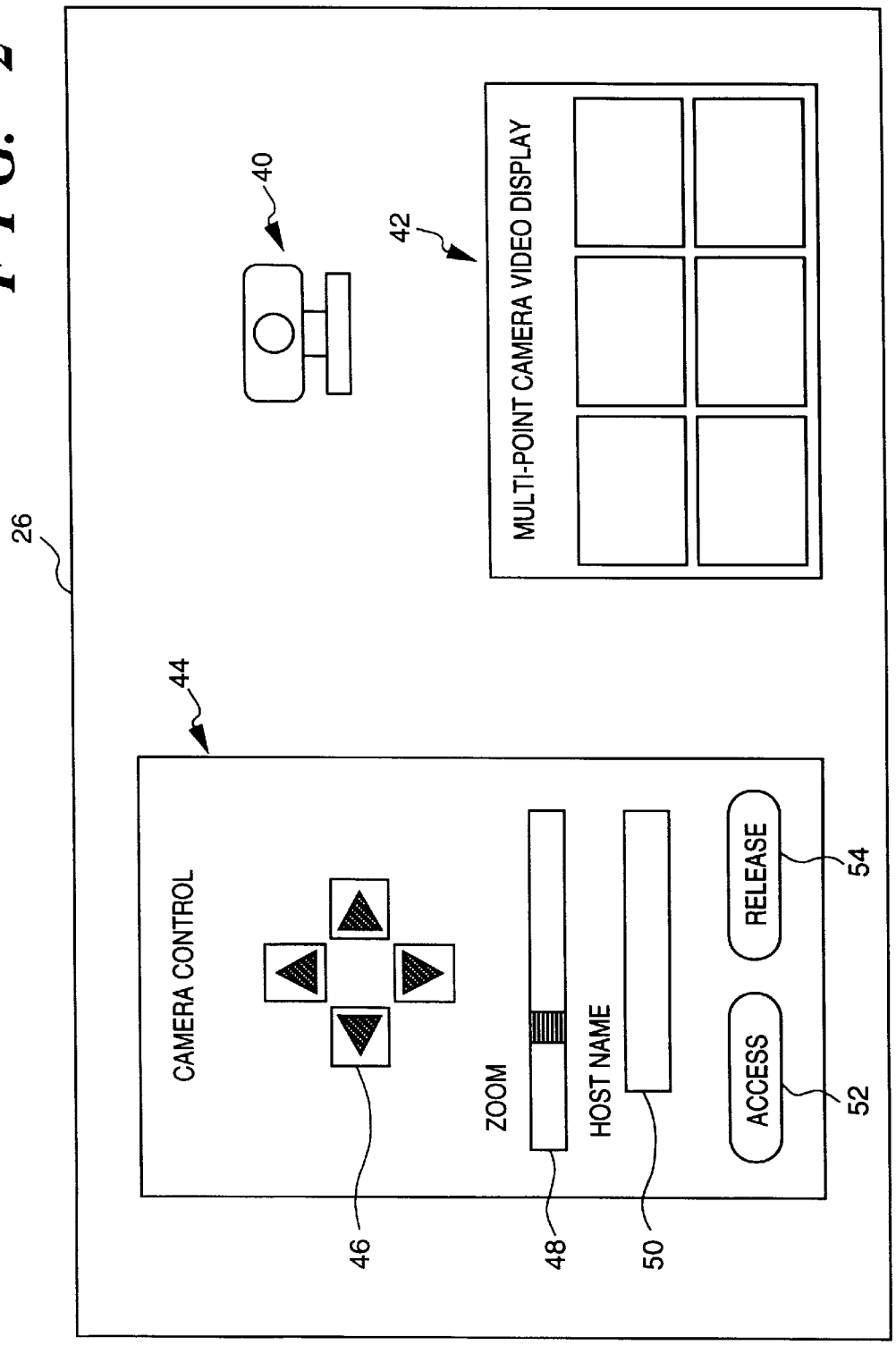
FIG. 2 is a view showing an example of a screen display on a display of a video communication terminal.

FIG. 2 shows an example of a display screen displayed on the display 26. Note that a window display system that can display a plurality of windows runs on these video communication terminals.

Figure 4:
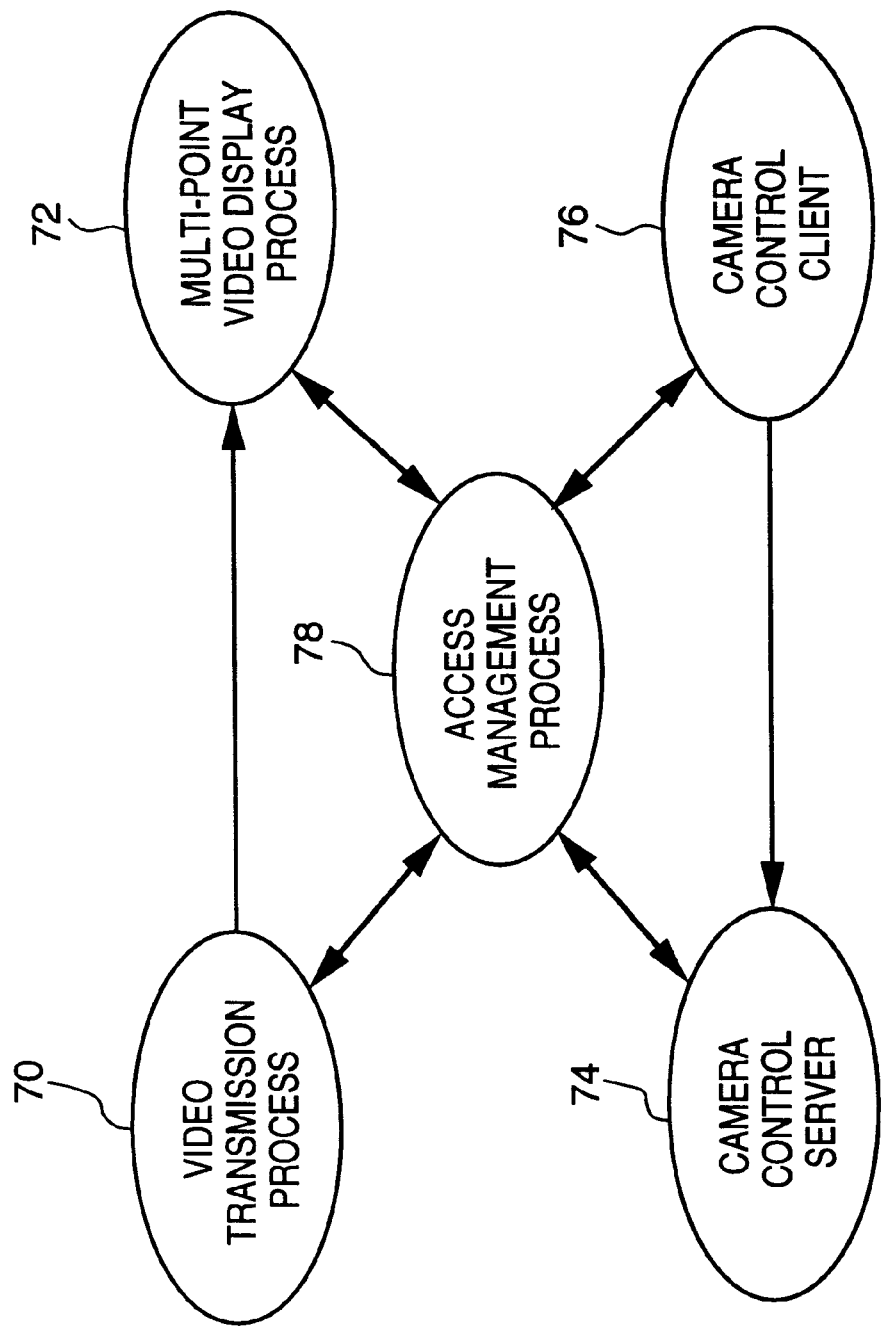
FIG. 4 is a chart showing the arrangement of processes executed by the video communication terminal of the first embodiment.

Reference numeral 40 denotes a symbol indicating that an image is being transmitted from the video camera 30. While the symbol 40 is displayed on the screen, it indicates that an image picked up by the video camera 30 connected to the communication terminal is being transmitted onto the network 12. Note that the symbol 40 is displayed by a video transmission process 70 (FIG. 4; to be described later).

Reference numeral 42 denotes a multi-point video display window for displaying some selected ones of images transmitted from other video communication terminals (in the case of the display 26 of the terminal 10-1, the window 42 displays images from other terminals 10-2, 10-3, 10-4, and the like). In order to select an image to be displayed, a menu for that purpose is used. In this case, however, the selection method is not particularly limited. An image transmitted from each of other communication terminals is an image updated at a rate corresponding to each specific purpose, e.g., a dynamic image, a still image which is updated once per 10 seconds, or the like. The transmission rate or updating rate is limited by the processing performance of each of the video communication terminals 10-1, 10-2, 10-3, 10-4, and the like, of course.

Reference numeral 44 denotes a camera operation panel, which comprises direction buttons 46 for attaining pan (right/left) and tilt (up/down) operations, and a zoom button 48 for attaining a zoom operation. Furthermore, the panel 44 comprises a host name display/input area 50 for inputting and displaying the terminal name (host name) of the video communication terminal to which the camera to be operated is connected, an access button 52 for requesting the right of access to the camera 30 connected to the video communication terminal whose host name is displayed on the host name display/input area 50, and a release button 54 for releasing the right of access. These buttons 46, 48, 52, and 54 can be operated using the mouse 28 by a known method.

The display 26 also displays an access state display window for indicating who is operating the camera 30 connected to its own terminal (e.g., the communication terminal 10-1) and observing the image.

Figure 3:
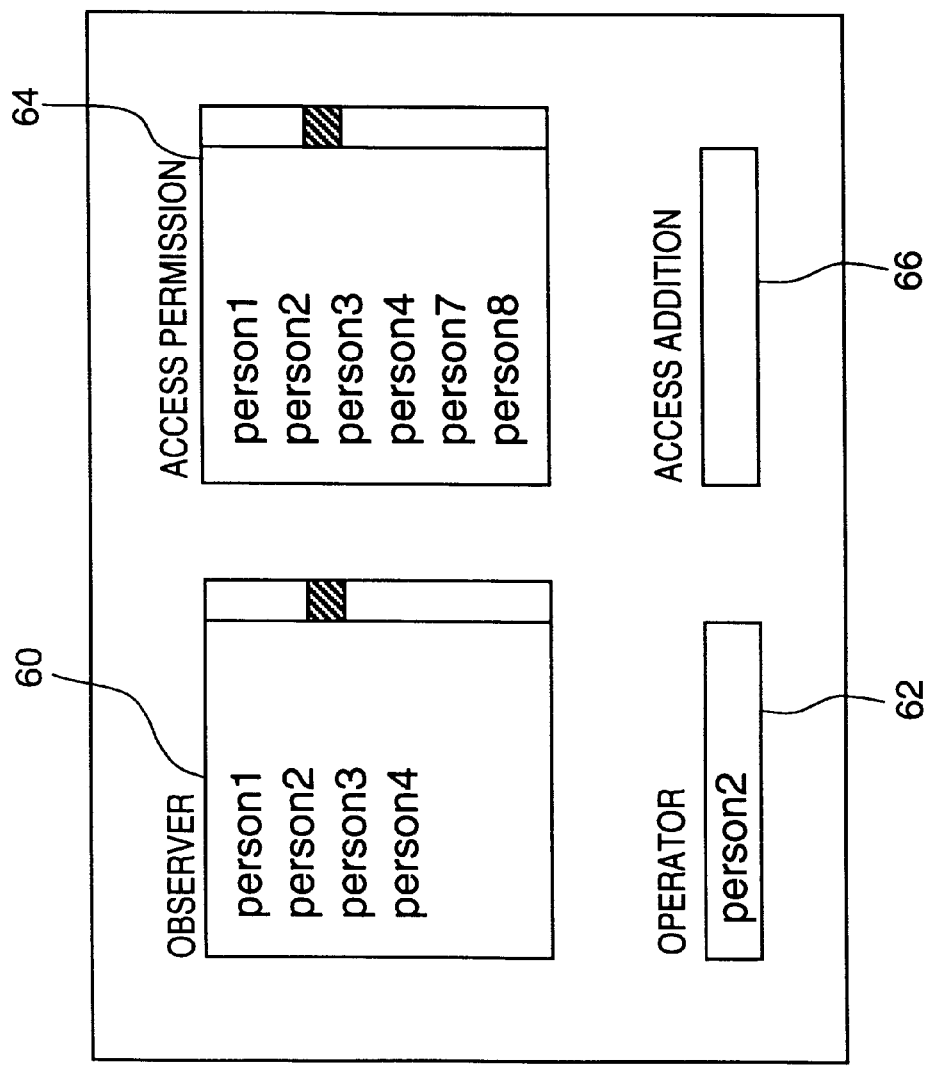
FIG. 3 is a view showing a display example of an access state display window.

FIG. 3 shows an example of the access state display window.

In the first embodiment, the access state display window can be displayed on the display 26 by double-clicking the symbol 40 using the mouse 28.

Reference numeral 60 denotes an observer list field for displaying a list of observers who are observing the image picked up by the video camera 30 and transmitted onto the network 12, i.e., an observer list. The list field 60 displays the login name of the communication terminal of each observer. If there are plurality of observers, the field 60 displays a list of the login names of all the observers. Reference numeral 62 denotes an operator field for displaying the name of an operator who is remote-controlling the camera 30 at present. The operator field 62 displays the login name of the operator. Reference numeral 64 denotes an access permission list field for displaying a list of the persons who are permitted to observe the image picked up by the camera 30. The list field 64 displays the login names of persons who are permitted to observe the camera image. Reference numeral 66 denotes an access addition field for inputting the login name of a person who is to be added to the access permission list. When (the login name of) a person who is not displayed on the access permission list field 64 is input to the access addition field 66, (the login name of) the person is added to the access permission list. When an operation for deleting (the login name of) one or a plurality of persons displayed on the access permission list is performed, the login name or names is or are deleted from the access permission list.

Note that the access permission list field 64 may display (the login names of) all the persons who are connected to the network 12, and may identify access-permitted persons in a specific color or using check boxes or the like. In this manner, addition/deletion to/from the access permission list is facilitated, and a person who is connected to the network 12 but is not permitted to access can be easily recognized. When the access permission list field 64 displays observers and an operator in specific colors or using check boxes each for discriminating one from another, the observer list field 60 and the operator field 62 may be omitted. However, when a large number of persons are connected to the network 12, it is often easy to identify them by displaying different fields, as shown in FIG. 3.

FIG. 4 is a chart showing the arrangement of processes executed by the video communication terminal of the first embodiment.

The video transmission process 70 executes capturing and transmission of an image from the video camera 30, and controls the display operations of the symbol 40 shown in FIG. 2 and the access state display window shown in FIG. 3. A multi-point video display process 72 displays images at six arbitrarily designated points of those transmitted from other points on the respective areas of the multi-point camera video display window 42.

A camera control server 74 receives a camera control command via the network 12, and transfers the received camera control command to the camera controller 32, thereby controlling the operation of the camera 30. A camera control client 76 displays the camera operation window 44 shown in FIG. 2 on the screen of the display 26, and transmits a camera control command corresponding to the operation on the window 44 to (the camera control server 74) of the video communication terminal displayed on the host name display/input area 50 via the network 12.

Note that the video transmission process 70, the multi-point video display process 72, the camera control server 74, and the camera control client 76 run on each of the video communication terminals 10-1, 10-2, 10-3, and 10-4.

An access management process 78 manages the remote control operations and image distribution operations of the cameras 30 of all the video communication terminals 10-1, 10-2, 10-3, and 10-4 connected to the network 12, and runs on a specific one of the video communication terminals or another work station for management of the remote control operations and image distribution operations of the cameras 30 on the network 12.

Figure 5:
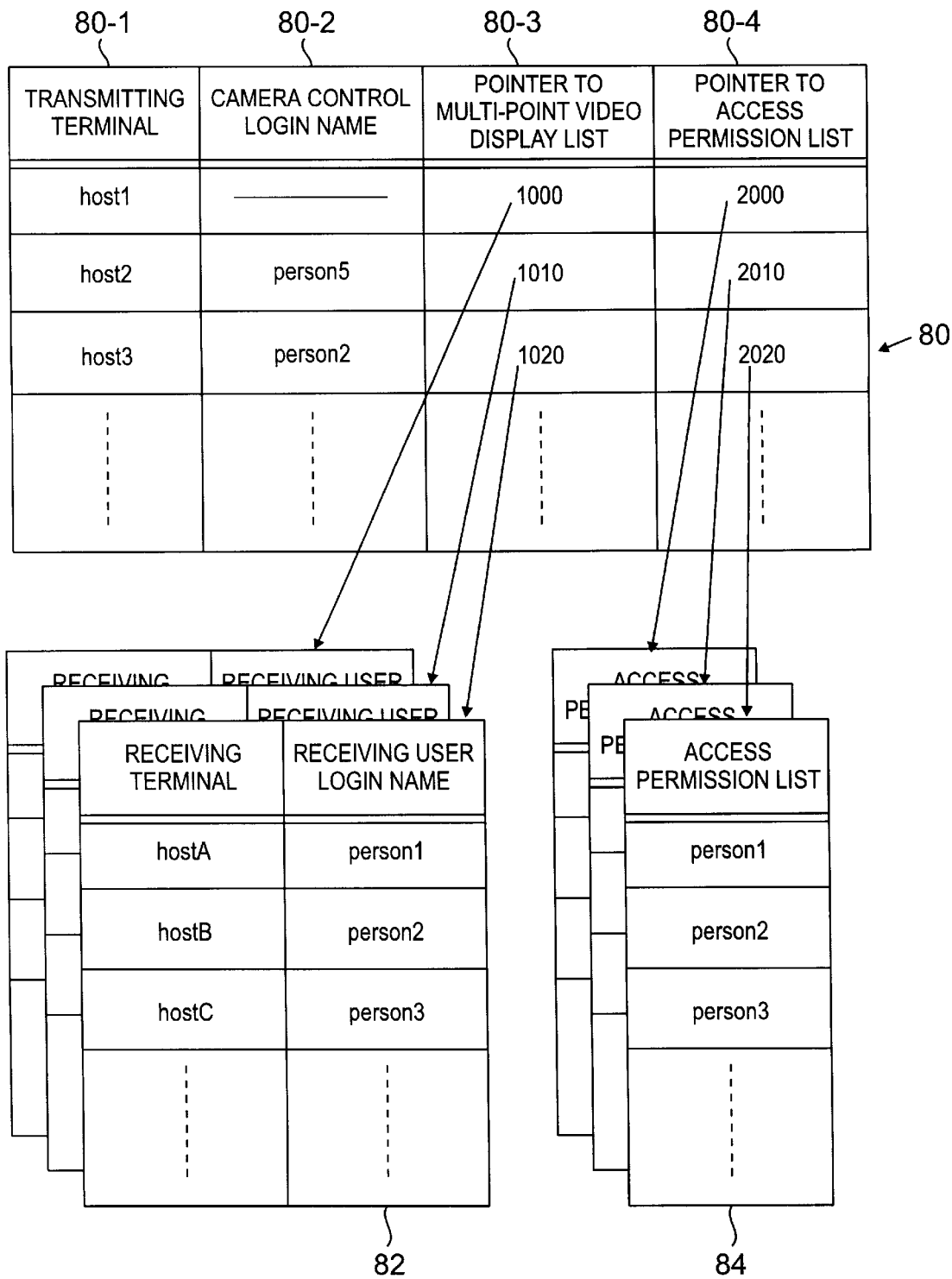
FIG. 5 is a schematic diagram of a management table managed by an access management process of the first embodiment.

FIG. 5 shows a management table managed by the access management process 78.

A transmission process list 80 comprises a field 80-1 for the names of all the video communication terminals, which are connected to the network 12 and on which the video transmission processes 70 run, i.e., the names (the host names (terminal names) of the workstations since the workstations are used in the first embodiment) of the video communication terminals which transmit images, a field 80-2 for the login names (camera control login names) of the terminals of operators who are remote-controlling the cameras 30 connected to the terminals, a field 80-3 for pointers to the multi-point video display lists, and a field 80-4 for pointers to the access permission lists.

When the video transmission process 70 is started, the name of the video communication terminal which is transmitting an image is notified to the access management process 78, and is registered in the field 80-1 of the transmission process list 80. The field 80-2 has no entry (in the case of host1 in FIG. 5) when there is no operator (terminal) which is remote-controlling the camera 30. When the field 80-2 has a login name, it indicates that the camera 30 of the terminal is being remote-controlled.

Multi-point video display process lists 82 are prepared in correspondence with the respective entries of the transmission process list 80. In each of these lists 82, the terminal names and login names of all the video communication terminals, which are receiving an image transmitted from the corresponding terminal as a transmission source, are registered. For example, in FIG. 5, the terminals which are receiving an image transmitted from host3 are person1 (login name) of host (receiving terminal), person2 (login name) of hostB (receiving terminal), person3 (login name) of hostc (receiving terminal), and the like. As the login name, the name used when an operator performs a login to each communication terminal (workstation) is used. Each of access permission lists 84 consists of the login names of operators of the video communication terminals which are permitted to access the video camera 30 of each transmitting terminal. In the example shown in FIG. 5, the camera 30 of host3 is operated by person2 of hostB.

Each of the multi-point video display process lists 82 is updated when the multi-point video display process 72 is started and when it switches an image to be displayed. More specifically, when the multi-point video display process 72 is started and switches an image to be displayed, it notifies the management process 78 of information including the terminal name and login name of the terminal which started the process 72, and the host names (transmitting terminal names) of transmission sources of one to six images to be displayed on the multi-point video display window 42 shown in FIG. 2 in the form of an updating request. The updating request data consists of the login name, start terminal name, N indicating the number of images to be displayed, and transmitting terminal names (terminals as transmission sources of images) 1 to N corresponding in number to N.

Upon reception of the updating request, the access management process 78 updates the multi-point video display process list 82.

Figure 6:
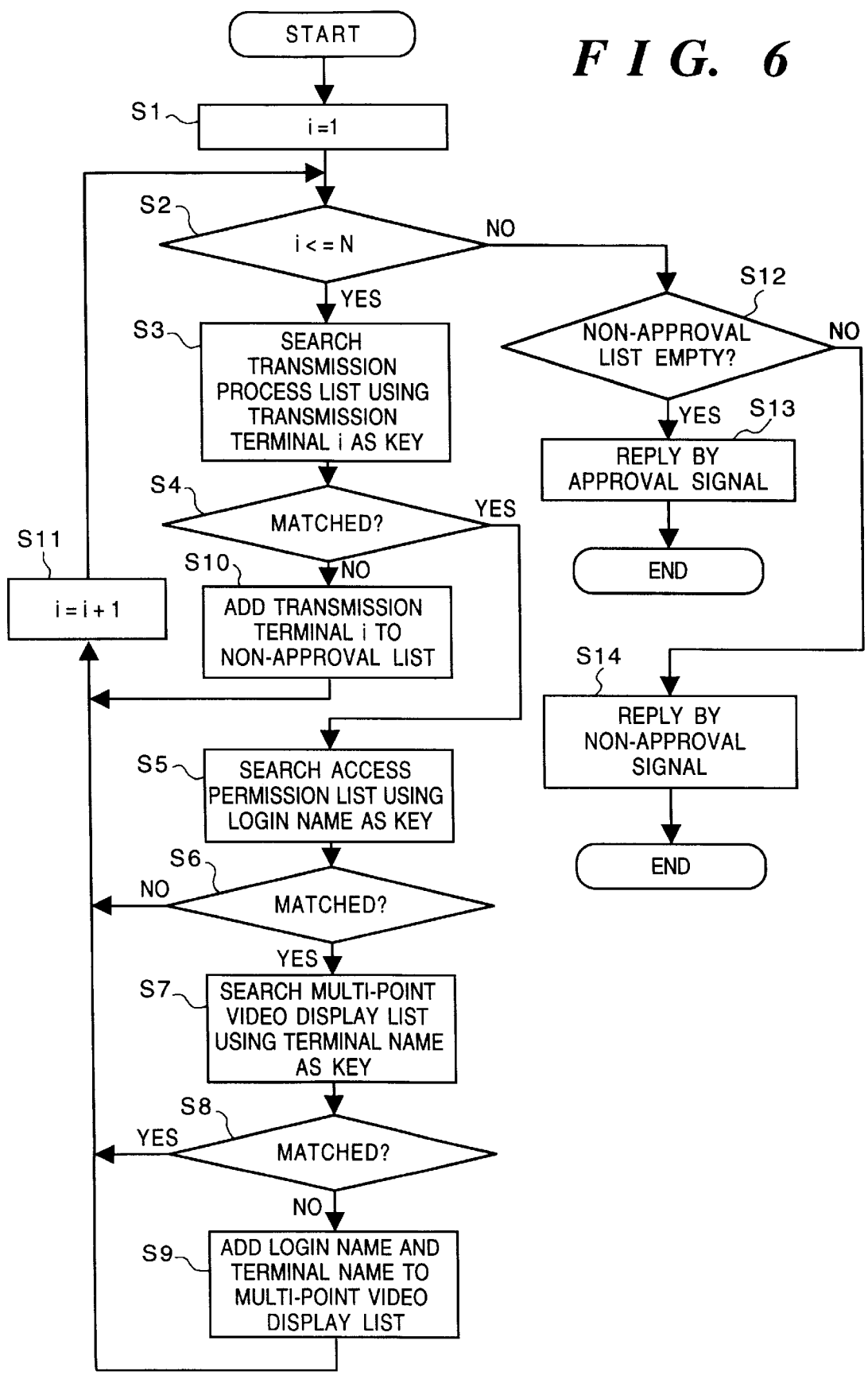
FIG. 6 is a flow chart showing the sequence of the updating processing by the access management process of the first embodiment.

FIG. 6 is a flow chart showing the updating processing sequence.

For a transmitting terminal name i (hosti=1 to N; S1, S2, S11) in data included in the updating request of the multi-point video display window 42, the field 80-1 of the transmission process list 80 is searched using the transmission terminal name i as a key (S3). If the list 80 includes a terminal name matching the transmitting terminal name i in the received updating request (S4), the access permission list 84 corresponding to the transmitting terminal i in the transmission process list 80 is searched using the login name included in the updating request as a key (S5).

If it is determined in step S6 that the access permission list 84 includes a login name matching that in the updating request, i.e., the login name is registered in the access permission list 84, the field of the receiving terminal name of the multi-point video display list 82 is searched using the start terminal name included in the updating request as a key (S7). If no matching terminal name is found (S8), the start terminal name and login name included in the updating request are additionally registered in the fields of the receiving terminal and receiving user login name of the multi-point video display list 82 (S9). At the same time, the new contents of the multi-point video display list 82 are notified to the corresponding transmitting terminals.

On the other hand, if it is determined in step S4 that no transmitting terminal name matches, the transmitting terminal name i is registered in a non-approval list (S10). The non-approval list is used for notifying the terminal as an updating request source of a video display request for a non-registered transmitting terminal (S14).

Upon completion of the processing in steps S3 to S10 for the respective transmitting terminals i (i=1 to N) in the data included in the updating request (S2), the flow advances to step S12 to check if the non-approval list is empty. If the non-approval list is empty, the flow advances to step S13 to return, to the terminal as the updating request source, an approval signal ACK indicating that images of all the transmitting terminals included in the updating request can be displayed. On the other hand, if is determined in step S12 that the non-approval list is not empty, the flow advances to step S14 to return, to the terminal as the updating request source, a non-approval signal indicating that an image from a transmitting terminal included in the non-approval list cannot be displayed. More specifically, information indicating whether or not images from the transmitting terminals included in the updating request can be displayed on the terminal as the request source is notified.

The multi-point video display process 72 displays on the display 26 a message indicating that an image from a requested transmitting terminal corresponding to the received non-approval signal cannot be displayed.

Figure 7:
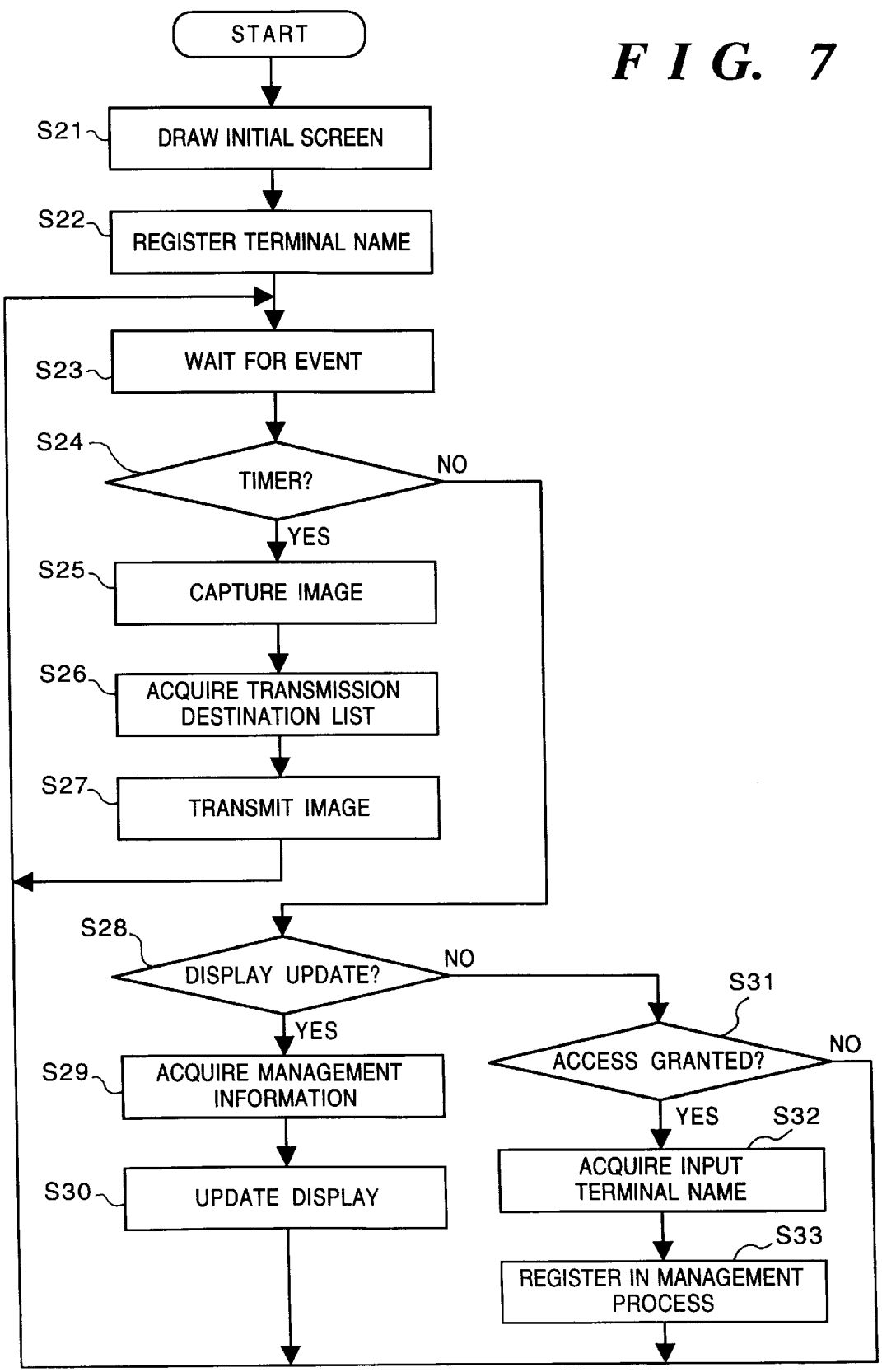
FIG. 7 is a flow chart showing the processing sequence of a video transmission process of the first embodiment.

FIG. 7 is a flow chart showing the operation sequence of the video transmission process 70 of the first embodiment.

When the video transmission process 70 is started, it displays an initial screen on the display 26 (S21), and registers its terminal name in the management process 78 (S22). Thereafter, the process waits for events (S23). In the first embodiment, three different events, i.e., an event of capturing an image, an updating request for requesting to change information presented by the GUI of the transmission process 70, and a request for changing an access permission, are assumed.

The event of capturing an image is generated as a timer event at predetermined time intervals by setting a timer (S24). Upon generation of a timer event (S24), the process 70 captures an image output from the camera 30 (S25), and acquires (the receiving terminal list of) the multi-point video display process list 82 corresponding to its own terminal name of the transmission process list 80 managed by the access management process 78 (S26). The list 82 may be acquired in a case of that the list 82 has been updated, if a rate of display is high. The acquired list serves as a list indicating the terminals as transmission destinations. The process 70 then multicasts the captured image to the receiving terminals described in the acquired multi-point video display process list 82 (S27).

The second event corresponds to a case wherein the access state changes, and an updating request for changing information presented by the GUI of the video transmission process 70 is generated (S28). This updating request is generated at the following timing. When the access management process 78 updates the multi-point video display list 82 in step S9 in FIG. 6, i.e., information indicating who is observing, the process 78 transmits the updated contents to the corresponding video transmission process 70, and requests it to update the information (S29). The video transmission process 70 updates the contents of the observer list field 60 on the basis of the information from the access management process 78 (S30).

As to information pertaining to the person who is operating the camera 30, when the access button 52 is depressed or when the release button 54 is depressed in a state wherein the name of the terminal that controls the camera 30 is input to the host name display/input area 50 of the camera operation panel 44, an information updating request is generated to the access management process 78. Upon reception of this request, the access management process 78 adds the terminal name in the camera control login name field 80-2 of the transmission process list 80 if the access button 52 is depressed. on the other hand, upon depression of the release button 54, the process 78 deletes and updates the terminal name and similarly generates an information updating request to the video transmission process 70. Thus, the video transmission process 70 updates the contents of the operator field 62 (FIG. 3) to the login name of the updated terminal. At this time, if the camera control login name field 80-2 of the terminal, which comprises the camera to be controlled, is not blank, i.e., when the camera 30 of the terminal is already being controlled by another terminal, a camera busy signal is returned to the terminal which issued the control request, and the terminal cannot operate the camera.

The third event corresponds to a case wherein a terminal name is input to the access addition field 66 to change the access permission state (S31). In this case, an addition request of a new terminal name which is granted permission to access is issued to the access management process 78 (S32, S33). Upon reception of this request, the access management process 78 updates the contents of the access permission list 84. More specifically, the process 78 adds the login name of the terminal to be requested to the access permission list 84. Of course, if the terminal has already been registered, the process 78 returns information indicating that the terminal has already been registered to the video transmission process 70, or ignores the additional registration.

As described above, in the first embodiment, since various kinds of information of, e.g., communication terminals which receive images distributed via the network, communication terminals which are permitted to receive the images, an operator (terminal) who (which) is operating the camera 30 of its own terminal, and the like are displayed on the screen, an image picked up by the video camera 30 of its own terminal can be prevented from being observed by an unauthorized third party.

In the first embodiment, a transmitted image is displayed in real time. However, the present invention can also be applied to a case wherein a compressed image is output onto the network 12, and is temporarily stored in the second storage device 24 or the like so as to be reproduced and displayed later.

[Second Embodiment]

Figure 8:
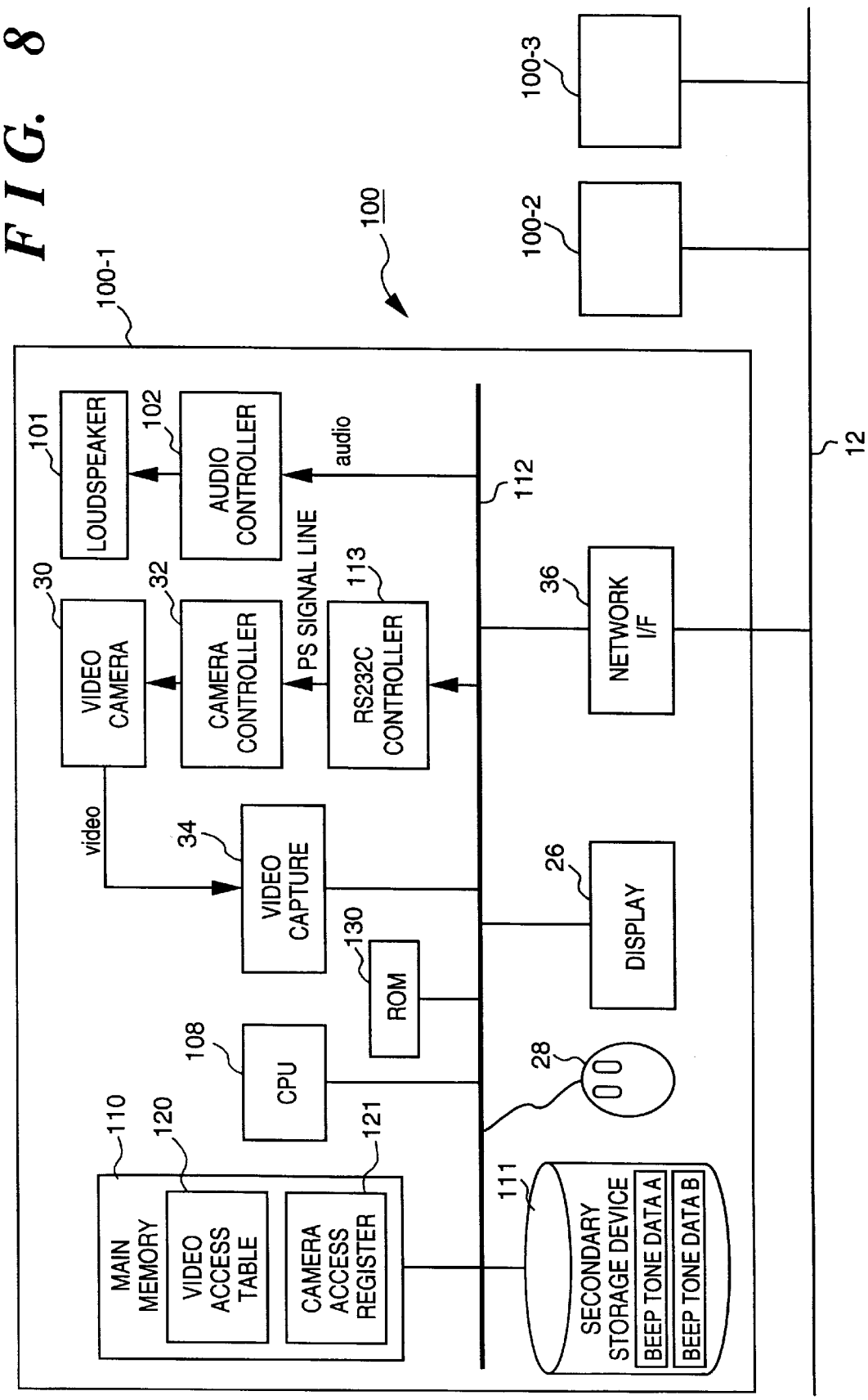
FIG. 8 is a schematic block diagram showing the arrangement of an image transmission system according to the second embodiment of the present invention.

FIG. 8 is a block diagram showing the arrangement of an image transmission system according to the second embodiment of the present invention. Note that the same reference numerals in FIG. 8 denote the same parts as in FIG. 1.

Referring to FIG. 8, reference numeral 100 (100-1) denotes a video communication terminal which inputs, transmits, and displays video (image) data. Reference numerals 100-2 and 100-3 denote video communication terminals which have similar arrangements to that of the video communication terminal 100-1. These terminals 100-1 to 100-3 are connected to a high-speed network 12, which can transmit an image, via their network I/Fs 36. A detailed explanation of only the video communication terminal 100-1 will be given below with reference to FIG. 8, but the same applies to other video communication terminals 100-2 and 100-3.

Reference numeral 112 denotes an internal bus of the video communication terminal 100-1. Reference numeral 102 denotes an audio controller, which converts digital audio data input from the internal bus 112 into an analog audio signal, and reproduces sounds corresponding to the audio data via a loudspeaker 101. A camera controller 32 controls the pan and tilt operations of a panpod (not shown) and the zoom and focusing operations of an optical system of a video camera 30 via a control signal line (RS232C). The camera controller 32 is controlled by a CPU 108 via an RS232C controller 113. The camera controller 32 can also be controlled by a remote terminal via the network 12.

In the second embodiment, the audio data format and video compression format are not particularly limited. In the above description, the control of the camera controller 32 uses a signal transmitted via the RS232C. However, the present invention is not limited to this as long as the CPU 108 can control the pan and tilt operations of a panpod (not shown) and the zoom and focusing operations of an optical system of the video camera 30. In the second embodiment as well, a general purpose workstation is assumed to be used as a base of the video communication terminal.

Figure 9:
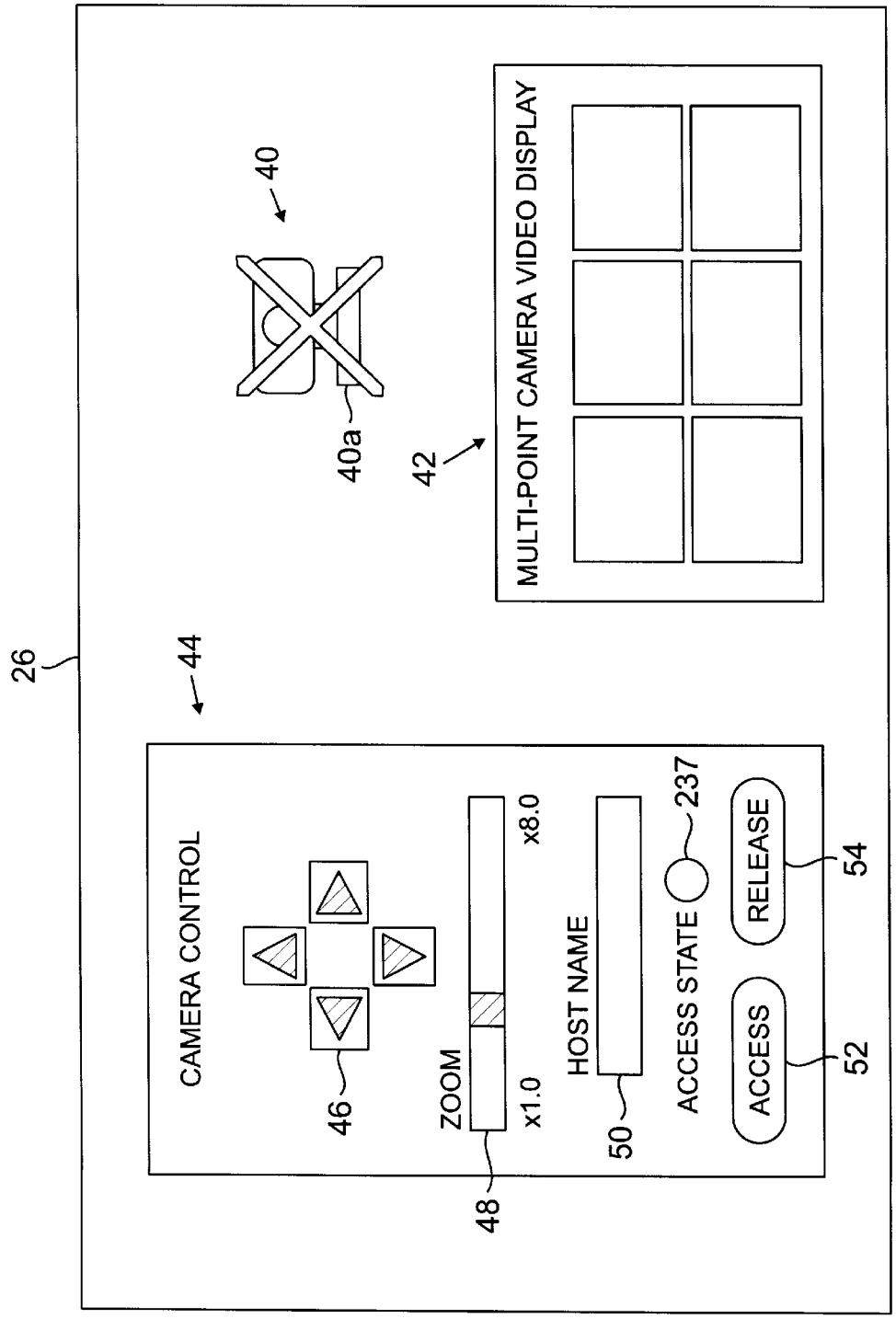
FIG. 9 is a view showing an example of a screen display on a display according to the second embodiment.

FIG. 9 shows an example of the screen display on a display 26.

Figure 10B:
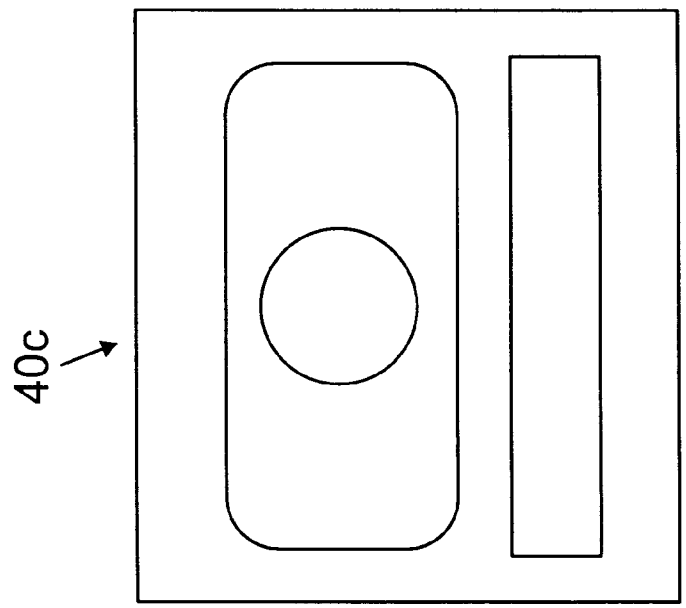
FIGS. 10A and 10B are views showing examples of icons indicating the access state to a camera in the second embodiment.
Figure 10A:
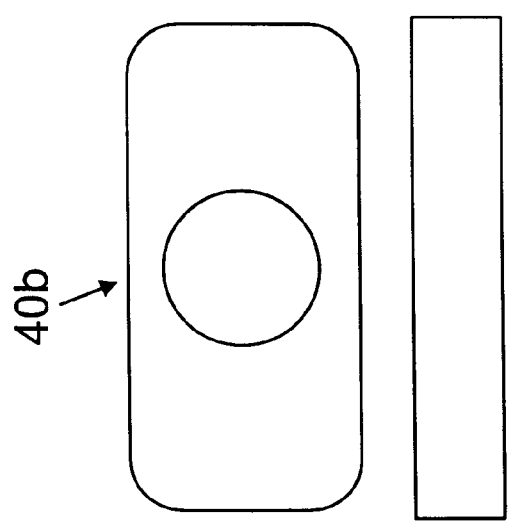

On the video communication terminal of the second embodiment, a window system that can display a plurality of windows runs, and an icon 40, a multi-point video display window 42, and an operation panel window 44 for operating the camera are displayed on the display screen of the display 26. Note that an icon 40a indicates that a video transmission process (to be described later) is not performing any video transmission, i.e., that neither an observer who is observing an image picked up by the camera 30 connected to its own terminal 100-1 nor an operator who is operating the camera 30 are present on the network 12. Note that icons shown in FIGS. 10A and 10B are set as those similar to the icon 40. When an icon 40b shown in FIG. 10A is displayed, it indicates that an image picked up by the camera 30 of its own terminal 100-1 is transmitted, i.e., there is an observer, who observes the image picked up by the camera 30, on the network 12. When an icon 40c shown in FIG. 10B is displayed, it indicates that the camera 30 of its own terminal 100-1 is controlled by another communication terminal.

On the other hand, the multi-point video display window 42 displays one or a plurality of images picked up by the cameras 30 of other designated video communication terminals 100-2, 100-3, and the like. Of course, an image picked up by the camera 30 of its own terminal 100-1 may be displayed on the window 42. A means for selecting video communication terminals whose images are to be displayed on the window 42 is attained by displaying a menu window (not shown) on the screen, and designating the network addresses or terminal names of other video communication terminals 100-2, 100-3, and the like. However, other selection methods may be used. As for transmission and display of images, an image which is updated at a rate corresponding to each specific purpose such as a full-motion dynamic image (30 frames/sec), a still image updated once per 10 seconds, or the like may be transmitted and displayed. The number of images to be displayed on the window 42 is not limited to that in this embodiment.

An indicator 237 on the operation panel window 44 is turned on in red to indicate a camera busy state when a camera to be controlled, which is already being controlled by another terminal, is designated by its host name and an access button 52 is depressed. If an access is granted, the indicator 237 is turned on in green. As described above, according to the second embodiment, the access state can be identified in accordance with the color of the indicator 237. Alternatively, the access state may be identified by character information.

FIG. 11 is a chart showing the arrangement of processes executed by the video communication terminal of the second embodiment. Note that these processes mean those in a multi-process OS such as UNIX, and each video communication terminal has a software mechanism that can run the multi-processes. The multi-process OS is stored in a ROM 130 and a secondary storage device 111. The OS is transferred to a main memory (RAM) 110 and is executed by the CPU 108 when the system is started. Of course, the OS can run as it is stored in the ROM 130. In the following description, sets of processes (to be referred to as processing processes) 11-1, 11-2, 11-3, and the like respectively correspond to the above-mentioned video communication terminals 100-1, 100-2, 100-3, and the like, and will be described below with reference to FIGS. 8 and 11.

A camera control process 411 in the video communication terminal 100-1 (processing process 11-1) receives a camera control command from a camera control client process 424 on another video communication terminal 100-2 (processing process 11-2) via the network 12, and issues a camera control signal to the camera controller 32 via the RS232C, thereby actually controlling the camera 30. The camera control process 411 receives a video request command from a video display process 423 on another video communication terminal 100-2, and issues an addition command of a video transmission destination to a video transmission process 412 of its own terminal 100-1. As will be described later, the process 411 supplies appropriate data to the audio controller 102 so as to control it to generate an effect sound at a specific timing. Furthermore, the process 411 displays a symbol (e.g., 40a) indicating the access (video, control) state of the camera 30 of its own terminal 100-1 on the screen (FIG. 9) of the display 26.

The video transmission process 412 controls a video capture 34 to capture and compress an image picked up by the video camera 30 at a predetermined frame rate, and transmits the compressed data onto the network 12. The process 412 can distribute an identical image to a plurality of other video communication terminals 100-2 and 100-3 that request the image from the camera 30 by performing a multi cast or a plurality of unicast operations of the image on the basis of an instruction from the camera control process 411.

A video display process 413 issues a video transmission request to a video transmission process on another video communication terminal, receives and expands requested video data via the network, and displays the expanded video data in the form of the multi-point video display window 42. In the example shown in FIG. 11, video display processes 423 and 433 of the video communication terminals 100-2 and 100-3 issue video transmission requests to the video transmission process 412 via the camera control process 411, and these terminals 100-2 and 100-3 receive video data from the terminal 100-1 via the network 12.

A camera control client 414 displays the operation window 44 (FIG. 9) on the screen of the display 26. When an operation instruction of the camera 30 of another terminal is input on the operation window 44, the client 414 issues a camera control command corresponding to the instructed camera operation to the camera control process of the other video communication terminal via the network 12.

Note that the processes 411, 413, and 414 are appropriately combined and implemented to run on each of other video communication terminals.

Reference numeral 450 denotes an access management process, which is connected to the camera control processes of all the communication terminals 100-1, 100-2, and 100-3 connected to the network 12, and manages accesses associated with camera images and camera operations of all the terminals. Therefore, the process 450 need only be implemented on a specific one of the video communication terminals on the network 12. In this example, the process 450 is implemented and started on the video communication terminal 100-1 (processing process 11-1).

Figure 12:
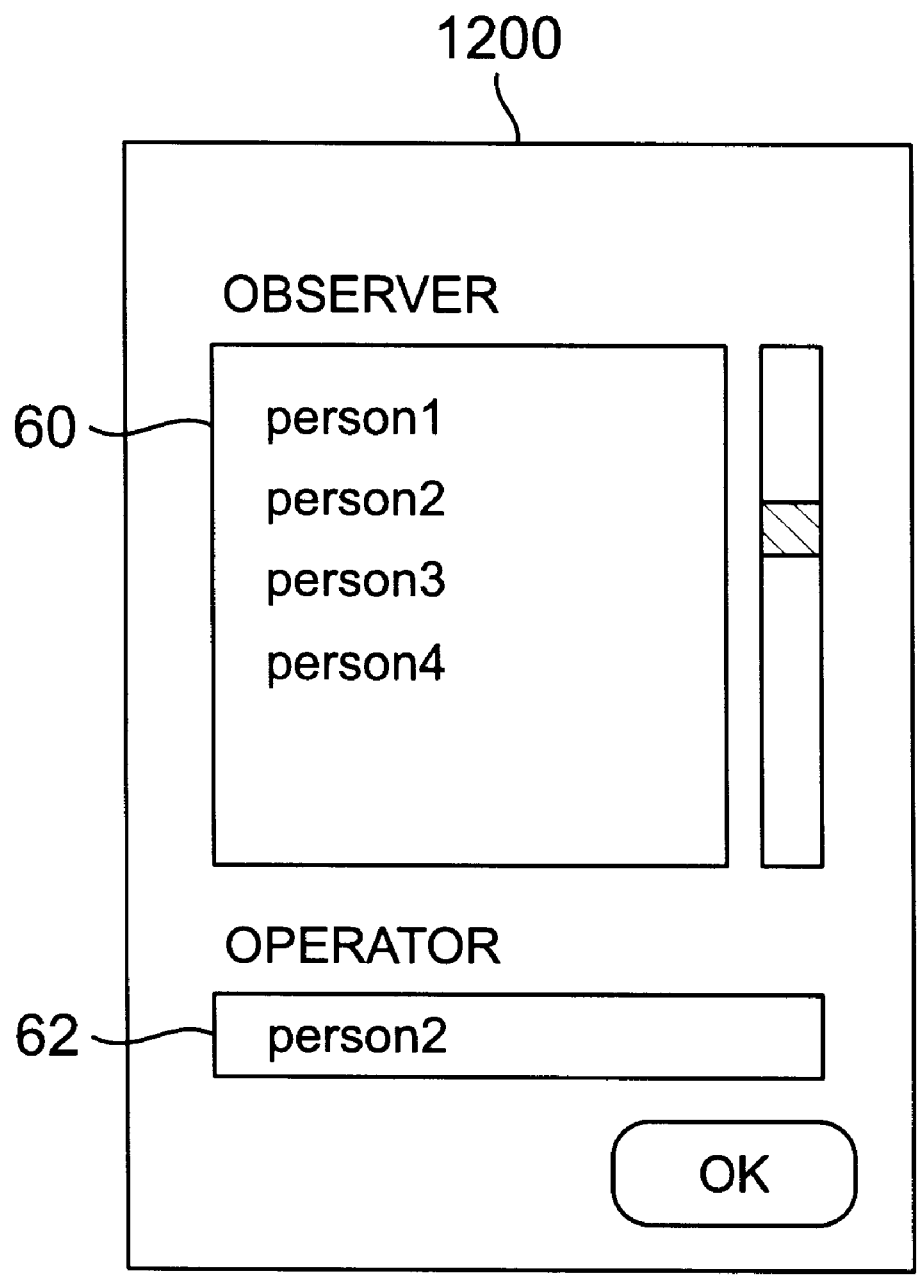
FIG. 12 is a view showing an example of a window for displaying access information to a video camera in the second embodiment.

FIG. 12 shows an access state display window 1200, which displays who is observing the image picked up by the camera connected to its own terminal 100-1 and who is operating the camera 30.

FIG. 12 corresponds to FIG. 3 described above. Reference numeral 60 denotes an observer list, which displays the name of an observer if there is an observer who is observing the image picked up by the camera 30 of its own terminal 100-1. Note that the name to be used on this window is a login name or is acquired by designating a name upon start of the system. If there are a plurality of observers, the list of the names of all the observers is displayed. Reference numeral 62 denotes an operator list, which displays the login name of an operator if there is an operator who is remote-controlling (controlling pan/tilt operations, or the like) of the camera 30 of its own terminal 100-1. Note that an access state display window 1200 is displayed by designating and clicking the icon 40 (40a, 40b, or 40c) in FIG. 9 using a mouse 28 (FIG. 8). More specifically, this display operation is attained in such a manner that the CPU 108 interprets the click instruction using the mouse 28, accesses data on a video access table 120 and a camera access register 121 on the main memory 110 in accordance with the interpretation result, and controls to display the window 1200 on the screen of the display 26 on the basis of the accessed data.

The operation of the video communication terminal of the second embodiment will be described below with reference to FIGS. 8, 11, 13, and 14.

Figure 13:
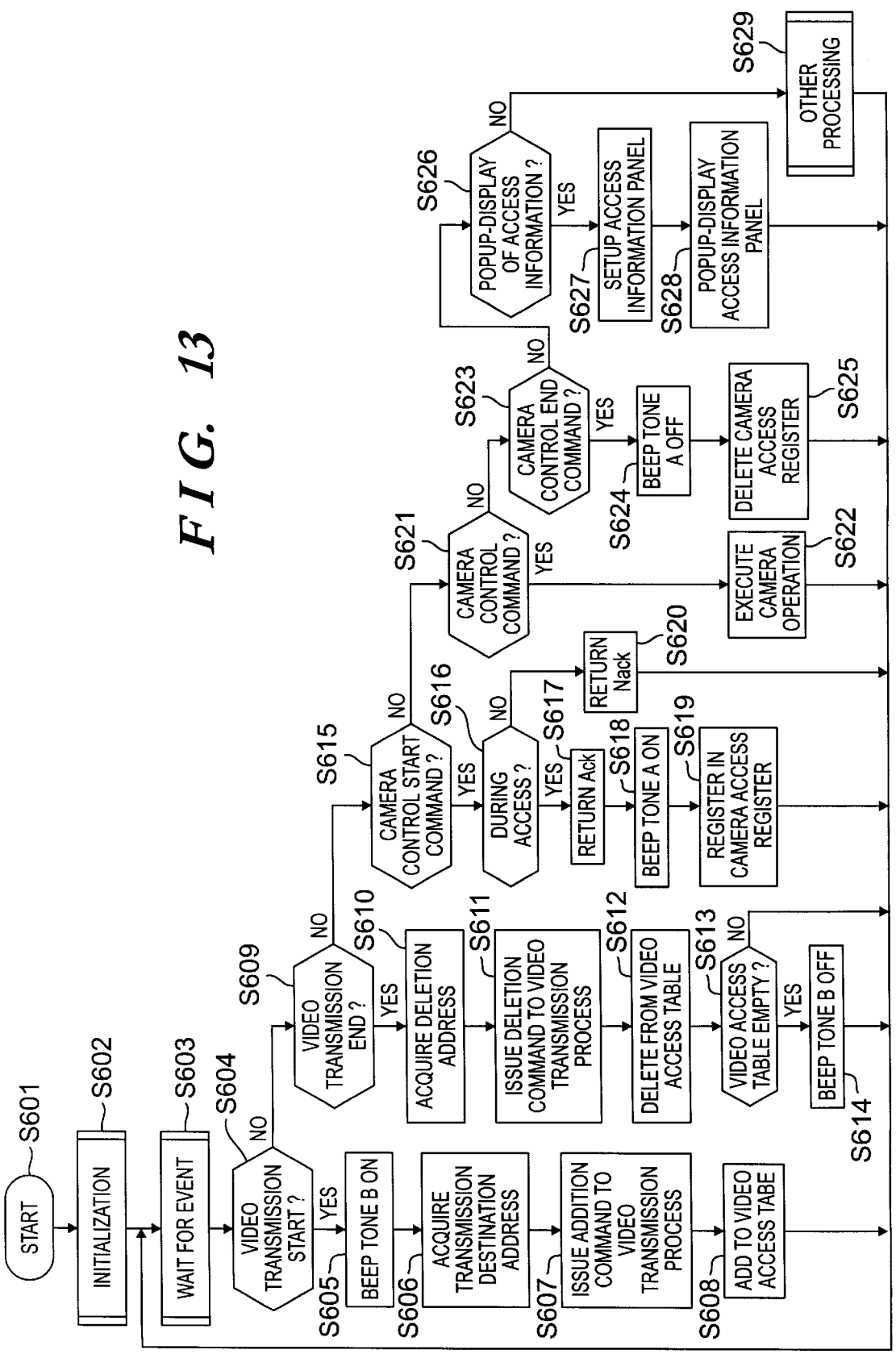
FIG. 13 is a flow chart showing the operation sequence of the video communication terminal of the second embodiment.

FIG. 13 is a flow chart showing the operation sequence of the camera control process 411. FIG. 14 shows the video access table 120 managed by the camera control process 411. The table 120 is assured on the main memory 110, as shown in FIG. 8. Also, the camera access register 121, which holds the user name of an operator who performs camera control, is similarly assured on the main memory 110, as will be described later.

When the camera control process 411 is started (S601), the state of the camera controller 32, and the video access table 120 and the camera access register 121 are initialized, and the icon 40, the multi-point camera video display window 42, and the camera operation panel window 44 are displayed (S602). In step S603, the control waits for generation of an event. The event includes keyboard and mouse events of a so-called window system, and a communication event such as data packet reception via the network. Note that the flow chart shows only events necessary for the following description.

Data transmitted via the network 12 includes a video transmission start request and a video transmission stop request, which are issued by the video display process 423 of another communication terminal (e.g., the terminal 100-2=processing process 11-2), a camera control command issued by the camera control client process 424, and the like. FIGS. 15A to 15E show the formats of these request (command) packets.

As shown in FIGS. 15A to 15E, the first field of each of packets 8-1, 8-2, 8-3, 8-4, and 8-5 indicates the type (video transmission or camera control) of request. Note that the user name (login name) who started the process that issued the packet is inserted in a field 814 or 843.

Figure 15:
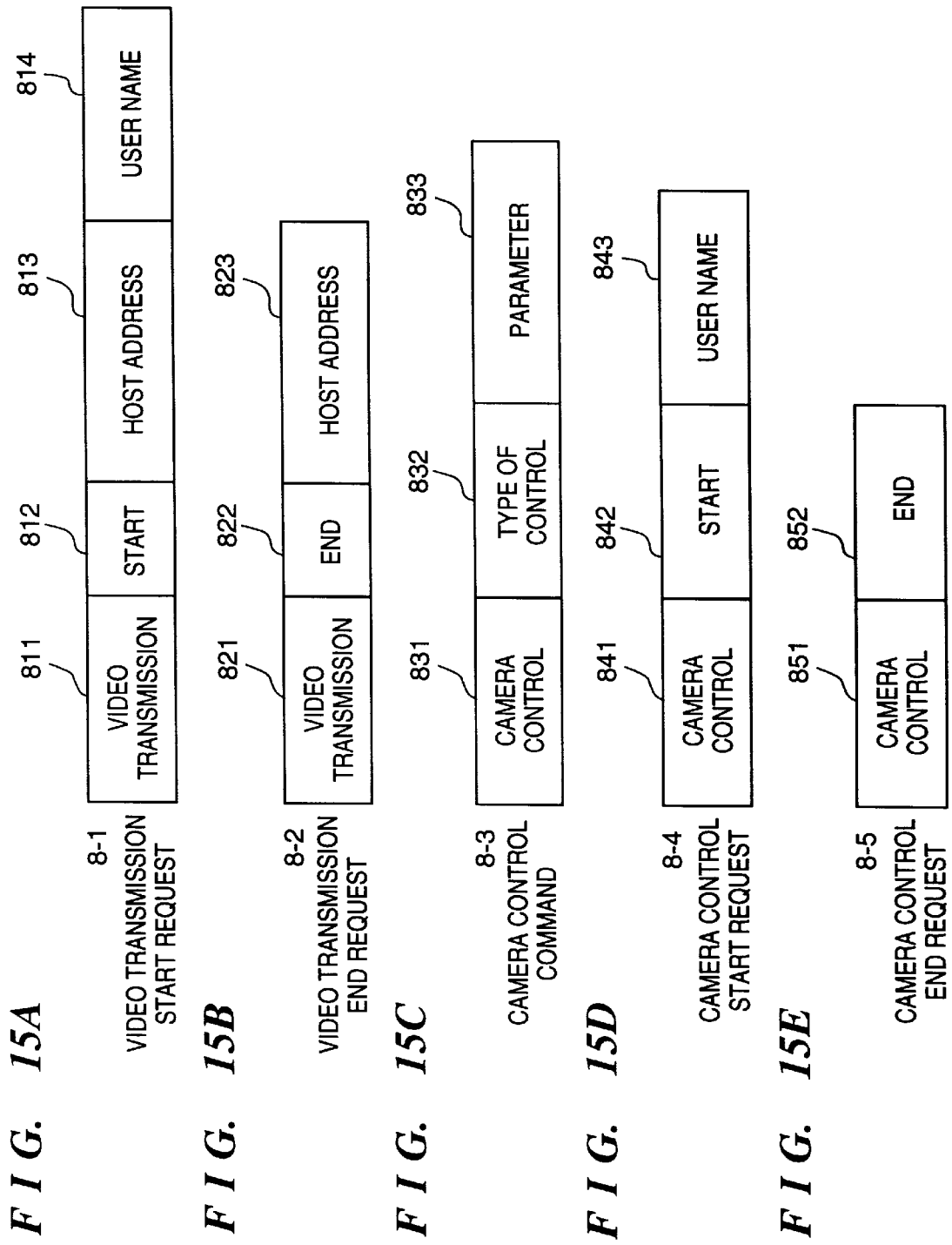
FIGS. 15A to 15E show the data formats of request packets in the second embodiment.

If it is determined in step S604 that the event (request packet) corresponds to a video transmission request 8-1 shown in FIG. 15A, the flow advances to step S605, and the camera control process 411 controls the audio controller 102 to output beep tone data stored in the secondary storage device 111 such as an HDD (hard disk device) and to reproduce the beep tone via the loudspeaker 101 so as to produce an effect tone (beep tone B). In step S606, the process 411 acquires the address (temporarily defined as "address") of the transmission source (the terminal that requests the video transmission) of the video transmission request from a third field 813 of the packet 8-1. In step S607, the process 411 issues a transmission destination addition command (to instruct to transmit data to "address") to the video transmission process 412. Upon reception of the transmission destination addition command, the video transmission process 412 adds "address" as the transmission destination of the aptured image. The flow then advances to step S608, and the camera control process 411 additionally registers the use name (acquired from a fourth field 814 in FIG. 15A) and the address (acquired from a host address 813 in the third field) of the terminal that issued the packet in the video access table 120. At this time, if these data are added in the empty video access table 120, the camera icon display changes from the icon 40a to the icon 40b. If an image is already being transmitted to the terminal that issued the request, the beep tone data B is read out from the secondary storage device 111 again, and is supplied to the audio controller 102. In this case, the beep tone is generated in the same manner as described above.

If it is determined in step S609 that the event (request packet) corresponds to a video transmission end request 8-2 (FIG. 15B), the flow advances to step S610, and the process 411 acquires the address (temporarily defined as "address") of the terminal to be deleted from the video access table 120 from a third field 823 (host address) of the packet 8-2. Furthermore, in step S611, the process 411 issues a transmission destination deletion command (instruct to stop video transmission to the terminal "address") to the video transmission process 412. Upon reception of the transmission destination deletion command, the video transmission process 412 deletes "address" from the transmission destinations of an image picked up by the camera 30. The flow then advances to step S612, and the camera control process 411 deletes an entry (access terminal name: host3, user name: person3) corresponding to "address" from the video access table 120. Furthermore, it is checked in step S603 if the video access table 120 is empty. If the table 120 is not empty, the current state is maintained; otherwise, the flow advances to step S614 to stop generation of the beep tone B and to restore the camera icon display to the icon 40a.

With this control, when the video transmission process 412 transmits an image picked up by the camera 30 of its own terminal to some terminal, generation of the beep tone and the display of the camera icon 40 are performed. For this reason, the operator of the terminal can easily recognize that an image picked up by the camera 30 of his or her terminal is being observed by a third party at another communication terminal.

If it is determined in step S615 that the event corresponds to a camera control start request 8-4 (FIG. 15D), the flow advances to step S616 to check if the camera access register 121 (FIG. 8) is empty. If the register 121 is not empty, since the camera of its own terminal is already being controlled by another terminal, the process 411 returns a message "Nack" indicating that camera control cannot be performed, to the terminal as the camera control start request source (S620).

On the other hand, if the register 121 is empty, the process 411 returns a message "Ack" indicating that camera control can be executed, to the terminal as the camera control start request source (S617). At the same time, in step S618, the process 411 controls the audio controller 102 to produce an effect tone (beep tone A), acquires the user name of the terminal that requested the camera control from a third field 843 of the packet 8-4, and registers the acquired user name in the camera access register 121 (S619).

Furthermore, if the event corresponds to a camera control request 8-3 (FIG. 15C) (S621), the flow advances to step S622. In step S622, the process 411 acquires the type of camera control and its control parameter from second and third fields 832 and 833 of the packet 8-3 in FIG. 15C, and controls the RS232C controller 113 in accordance with the acquire type of control and control parameter to supply signals to the camera controller 32 via the RS232C, .thus controlling the operation of the camera 30. Note that the control parameter 833 includes parameters representing, e.g., the pan angle, zoom ratio, and the like, and the type of control 832 includes pan, tilt, zoom operations, and the like. However, the present invention is not limited to these in this embodiment.

If a camera control end request 8-5 (FIG. 15E) is generated as an event (S623), the flow advances to step S624, and the process 411 controls the audio controller 102 to stop the beep tone A and resets the contents of the camera access register 121 (S625).

With the above-mentioned control, while the camera 30 of its own terminal is controlled, since a beep tone is being generated, the operator of the terminal can easily recognize that someone is operating the camera 30 of his or her terminal.

Since different beep tones (effect tones) are generated in correspondence with the camera control access and the video access, the operator of the terminal can discriminate the type of access by hearing the beep tone. For example, the type of access may be discriminated depending on the pitch (frequency) of the beep tones, the interval of beep tones, or the like.

On the other hand, if the event corresponds to the click operation of the camera icon 40 (S626), the flow advances to step S627, and the process 411 reads the contents of the video access table 120 (FIGS. 8 and 14) and the camera access register 121 (FIG. 8) and popup-displays a window for displaying access information as the window shown in FIG. 12 (S628). With this control, the operator of the terminal can recognize in detail who is observing an image picked up by the camera 30 of his or her terminal or who is operating the camera 30.

If the event is other than the above-mentioned events (S626), the flow advances to step S629, and the process 411 executes processing corresponding to the event. Thereafter, the flow returns to step S603.

As described above, when an image picked up by the camera 30 of its own terminal is observed by another terminal via the network 12, an effect tone is generated, and detailed information associated with the current access is displayed on the screen of the display 26. For this reason, even when the operator performs another job, he or she can recognize that someone is observing an image picked up by the camera 30.

The effect tone is generated in correspondence with the camera control request from the network, and detailed information associated with the request is displayed on the screen. Therefore, the problem of privacy violation posed when someone stealthily observes an image picked up by the camera of another terminal or operates the camera can be eliminated.

Furthermore, since information indicating the terminal which is observing a transmitted image or controlling the camera is displayed, the problem of privacy violation can be further eliminated.

A light may be turned on and off instead of generating the effect tone. Time intervals of turning on and off or the intensity of the light can be changed in accordance with the state of the camera 30.

[Third Embodiment]

In the third embodiment, different effect tones are generated in correspondence with the camera control operations such as zoom, pan, tilt operations, and the like, in addition to the above-mentioned second embodiment. Especially, as for the zoom operation of the camera 30, since a zoom-up operation allows observation of the details, the privacy of the user is easily violated. For this reason, an effect tone that calls stronger attention of the user is generated. In the third embodiment, in place of generating a beep tone in step S618 in FIG. 13, different beep tones may be generated in correspondence with the type of camera operation (the field 832 of the camera control command in FIG. 15C) and its parameter (the field 833 of the camera control command) between steps S621 and S622. More specifically, in a zoom-up operation, beep tones are intermittently generated at short generation intervals. On the contrary, in a zoom-down operation, the generation intervals of beep tones are prolonged. Also, in pan and tilt operations, different beep tones are used.

Alternatively, the tone volume of beep tones may be increased in a zoom-in (telephoto) state, and may be decreased in a zoom-out (wide-angle) state. In this manner, the tone volume is controlled in correspondence with the zoom ratio of the camera 30, so that any person falling within the field of view of the camera 30 can hear the beep tone, thus also calling attention of the person who falls within the field of view of the camera 30.

In this manner, since the type of control operation of the camera 30 can be easily discriminated depending on the beep tone, the user can be effectively informed of the content of the alarm. Since the required tone volume is set in correspondence with the zoom ratio, attention of any person who falls within the field of view of the camera 30 can be called in accordance with the field of view of the camera 30.

[Fourth Embodiment]

In the fourth embodiment, different effect tones are used in correspondence with the number of persons (the number of terminals) who or which are making accesses to the camera 30 of its own terminal, in addition to the second embodiment.

A function of obtaining the number of persons, who are making accesses to an image picked up by the camera 30 of its own terminal, on the basis of the number of entries of the video access table 120 (FIGS. 8 and 14), and changing the frequency of the effect tone in accordance with the number of persons can be added between steps S608 and S612 in FIG. 13. More specifically, the frequency of a beep tone may be increased when the number of persons who are making accesses is large, and may be decreased when the number of persons is small, thereby calling attention of the user in correspondence with the number of observers who are violating the user's privacy.

With this control, since the number of observers who are observing an image picked up by the camera 30 of its own terminal can be directly detected, the user can be informed of the content of the alarm more effectively.

[Fifth Embodiment]

Figure 16:
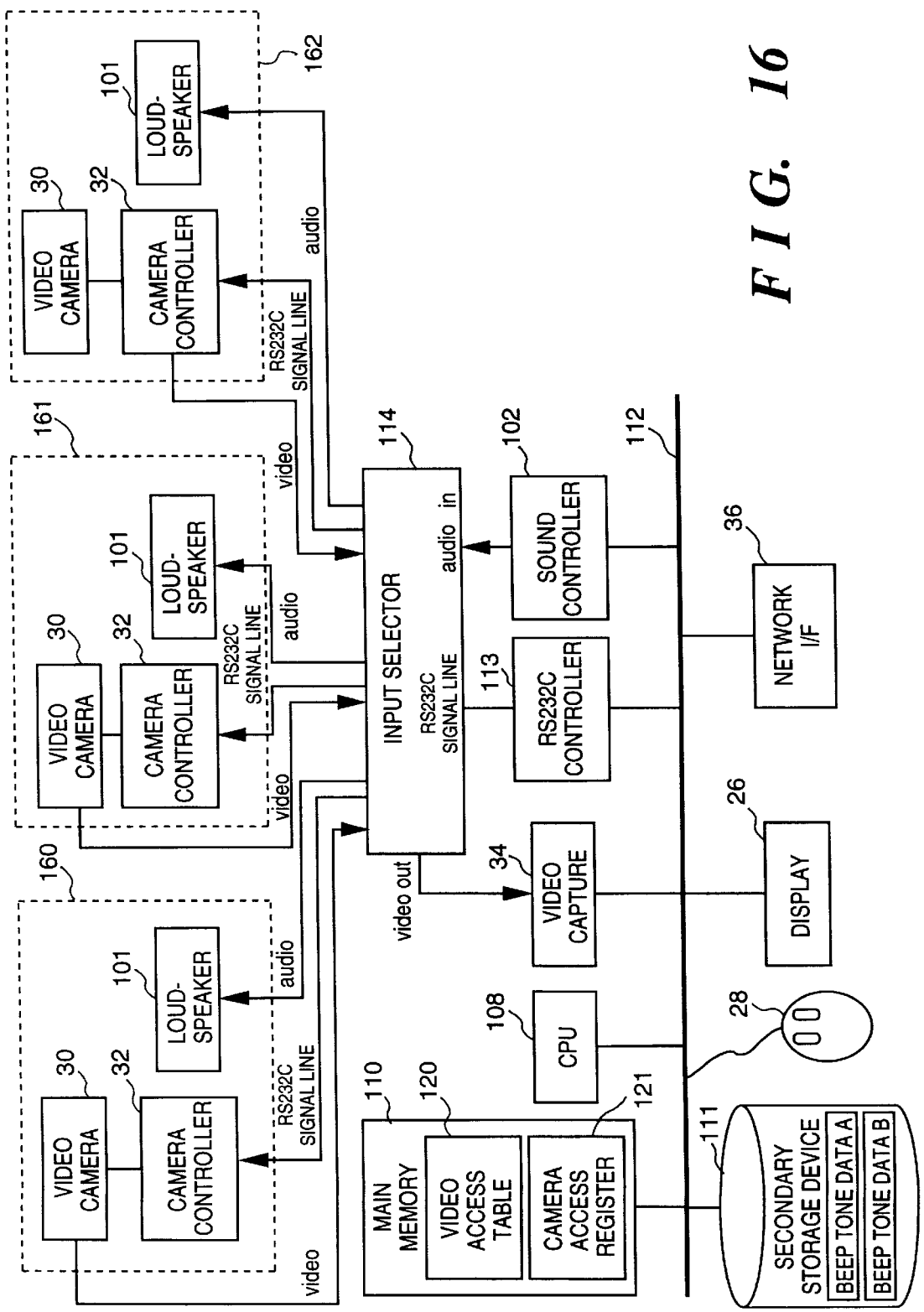
FIG. 16 is a schematic block diagram showing the arrangement of an image transmission system according to the fifth embodiment of the present invention.

The fifth embodiment allows the first to fourth embodiments to control a plurality of camera units 160, 161, and 162, each of which comprises a video camera 30, a camera controller 32, and a loudspeaker 101, by switching or selecting video, audio and RS232C signal lines using a signal line switching unit (an input selector 114 in FIG. 16).

FIG. 16 shows only a portion of the terminal 100-1 in FIG. 8 of the above-mentioned second embodiment in correspondence with the fifth embodiment. Only differences from the first to fourth embodiments will be explained below. The camera 30 and the loudspeaker 101 belonging to a single camera unit are arranged adjacent to each other so that, for example, an effect tone produced by the loudspeaker 101 is heard from a specific camera 30, i.e., a correspondence between the effect tone and the camera is easily determined.

In the embodiment shown in FIG. 16, the loudspeaker 101, the video camera 30, and the camera controller 32 constitute a camera unit. In this embodiment, the terminal has three camera units 160, 161, and 162. Note that the number of camera units is not limited to three. Unit numbers are assigned to these camera units 160, 161, and 162, and the camera 30 of each terminal is uniquely designated by "terminal name+camera unit number" on a network 12. These camera units 160, 161, and 162 are selected by the input selector 114, i.e., corresponding video, audio, and RS232C signal lines are selected. RS232C, video, and audio signals can be simultaneously switched in units of camera units. Therefore, at a specific time, only one camera unit serves as an object to be controlled. Note that the input selector 114 itself is controlled by an RS232C signal. More specifically, a camera control operation and an image switching operation are attained by inputting a camera unit number.

The input selector 114 has a function of checking the camera unit number and supplying a camera control request to the camera control unit 32 corresponding to the designated camera unit number, and a function of switching video/audio inputs with respect to the designated camera unit number. Therefore, request packets 12-1, 12-2, 12-3, 12-4, and 12-5 associated with camera control and video transmission are used, as shown in FIGS. 19A to 19E. In these packets, fields 191 to 195 of the camera unit number are added to the request packet formats (FIGS. 15A to 15E) of the second embodiment. Note that other fields are the same as those in FIGS. 15A to 15E.

Figure 17:
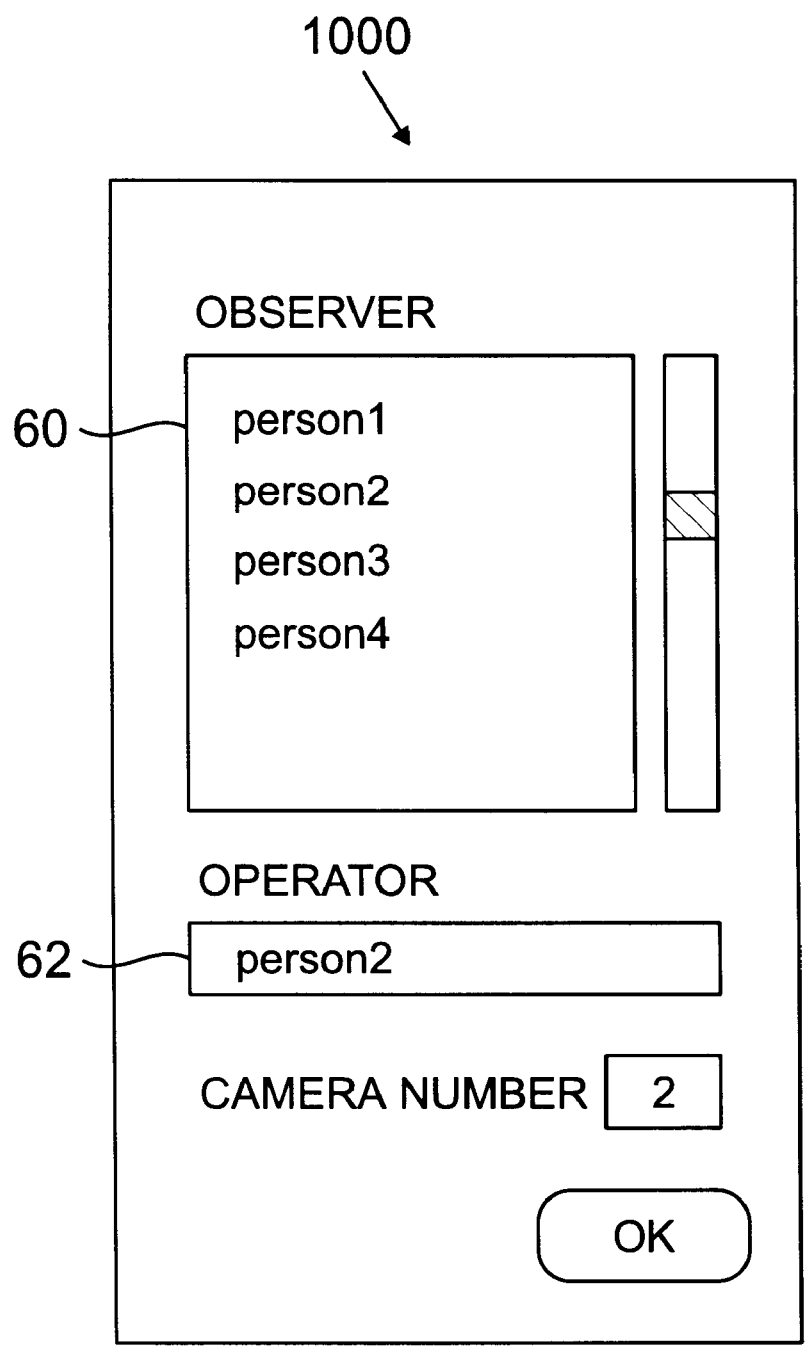
FIG. 17 is a view showing an example of a window for displaying access information in the fifth embodiment.
Figure 18:
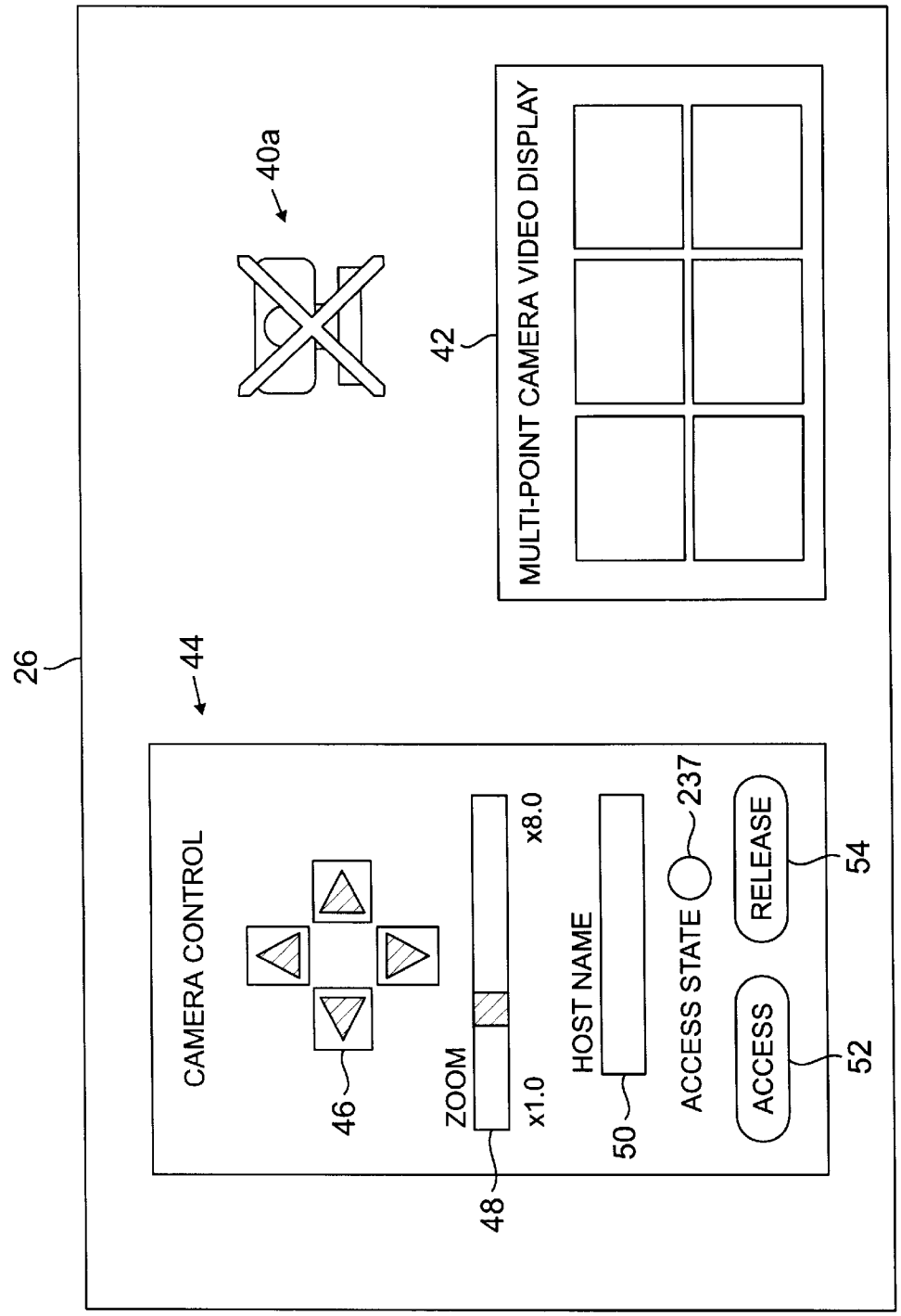
FIG. 18 is a view showing an example of the display screen of a display of a terminal in the fifth embodiment.

At this time, in the camera operation and video display operation, not only the host name (terminal name) but also the camera number are designated. For example, as shown in FIG. 18, a camera number designation field 1138 is added to a camera operation window 1130 corresponding to the camera operation window 44 shown in FIG. 2 or 9. Also, as shown in FIG. 17, a window 1000 added with a camera number display field 1030 is displayed in correspondence with the window 1200 (FIG. 12) for displaying access information. The window 1000 is prepared in units of camera units. Note that the same reference numerals in FIGS. 17 and 18 denote the same parts as in FIGS. 9 and 12, and a detailed description thereof will be omitted.

The arrangement of the processes of the fifth embodiment is the same as that in the above-mentioned second embodiment, and the operations of the processes are the same as those in the second embodiment, except that the camera unit number is designated in addition to the terminal name, and while a given camera unit is controlled, it cannot be switched to other camera units. More specifically, in the camera control process 411, if one camera unit is in control, other camera units are also set in an in-use state, so that accesses to all the camera units are denied. That is, only one camera unit is set in an in-use state, i.e., in an active state. Therefore, an effect tone need only be generated for only the camera 30 of an active camera unit.

In the fifth embodiment, since video and audio signals can be simultaneously switched, the processing sequence of the camera control process in terms of this point can be the same as that in the flow chart shown in FIG. 13.

According to the fifth embodiment, since the input selector 114 is added to multiplex the camera units 160, 161, and 162, a plurality of cameras 30 can be added to a single video communication terminal 100-1. Even when the camera 30 is separated from the video communication terminal 100-1 main body, since the loudspeaker 101 is arranged in the vicinity of the camera 30, a video/control access to the camera 30 can be easily confirmed by a beep tone generated by the loudspeaker 101.

[Sixth Embodiment]

In the sixth embodiment, in place of switching the camera units by the input selector 114 in the above-mentioned fifth embodiment, a video capture 34, an RS232C controller 113, and an audio controller 102 are also multiplexed, so that a plurality of camera units are simultaneously controlled in parallel.

FIG. 20 shows only a portion of the video communication terminal 100-1 in FIG. 8 showing the above-mentioned second embodiment in correspondence with the sixth embodiment. The same reference numerals in FIG. 20 denote the same parts as in FIG. 8. In FIG. 20, the terminal has three camera units 160, 161, and 162. However, the number of camera units is not limited to three, as a matter of course. Only differences from the above embodiment will be explained below.

In the sixth embodiment, the camera units are multiplexed as in the fifth embodiment described above. However, since the video capture 34, RS232C controller 113, and audio controller 102 are multiplexed, i.e., video captures 34A, 34B, and 34C, RS232C controllers 113A, 113B, and 113C, and audio controllers 102A, 102B, and 102C are arranged, the video capture, camera control, and effect tone generation operations can be completely parallelly controlled, thus removing a limitation as compared to the fifth embodiment. More specifically, even when the camera 30 is controlled in the camera unit 160 connected to the video communication terminal 100-1, a limitation that disables use of other camera units 161 and 162 can be removed. In the fifth embodiment, the camera control process 411 and the video transmission process 412 are started in correspondence with the number of camera units to control the corresponding camera units. Other operations are the same as those in the first to fifth embodiments.

As described above, according to the sixth embodiment, a limitation that disables use of other camera units during control of one camera unit can be removed for cameras 30 connected to a single video communication terminal, as compared to the fifth embodiment.

[Seventh Embodiment]

In the seventh embodiment, in addition to the fourth embodiment described above, in correspondence with the number of persons (number of terminals) who are observing an image picked up by a camera or control the camera, not only tones are generated but also icons such as still images obtained by symbolizing the faces of actual persons are displayed on the screen of the display 26 while corresponding users access the camera. When the access has ended, the corresponding icon display is turned off. In this manner, persons who are making accesses to the camera 30 of its own terminal and the number of persons who are making the accesses can be visually recognized.

For example, still image icons (each having a size of about 64×64) of users' faces are stored in advance in the secondary storage device 111 in correspondence with their user names (to be referred to as a user icon table). When an image picked up by the camera 30 of its own terminal is accessed, the video access table 120 (FIG. 14) is searched for a user who requested this access, the user icon table is searched for the icon of the user who requested the access, and the searched icon can be displayed on the screen. Such processing can be added between steps S608 and S612 in FIG. 13.

With this control, since users who are observing an image picked up by the camera 30 of its own terminal and the number of users can be visually confirmed, the user can be informed of the content of the alarm more effectively.

Note that the present invention may be applied to either a system constituted by a plurality of equipments (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can realize the functions of the above-mentioned embodiments to the system or apparatus, and reading out and executing the program code stored in the storage medium by a computer (or a CPU, MPU, or the like) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiment may be realized not only by storing and executing the readout program code in the RAM 112 by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer and receives the program code read out from the storage medium.

When the present invention is applied to the storage medium, the storage medium stores the program code corresponding to the above-mentioned flow chart. This will be briefly described below. In this case, the program modules of the ROM 130 shown in FIG. 1 are stored in the storage medium. More specifically, program codes that realize function modules, i.e., "video transmission process", "video display process", "multi-point video display process", "camera control process", and "access management process" can be stored in the storage medium.

The present invention is not limited to the above embodiments and various changes and modifications can be made within the spirit and scope of the present invention. Therefore, to apprise the public of the scope of the present invention, the following claims are made.

What is claimed is:

1. An image transmission apparatus which is connected to a network and transmits/receives an image, comprising:
    a display unit;
    image input means for inputting an image, the movements of said image input means are controlled by a communication terminal connected to the network;
    transmission means for transmitting the image input by said image input means onto the network; and
    display means for displaying information indicating the communication terminal which is controlling the movements of said image input means via the network, on said display unit.

2. The apparatus according to claim 1, further comprising multi-point image display means for displaying images received from a plurality of communication terminals via the network on said display unit.

3. The apparatus according to claim 1, further comprising means for specifying a communication terminal connected to the network and requesting a control of the movements of an image input means of the communication terminal.

4. The apparatus according to claim 3, wherein said image input means comprises a camera, and the operation control includes at least one control processing of pan processing, tilt processing, zoom processing, and focusing processing of said camera.

5. The apparatus according to claim 1, further comprising means for displaying, on said display unit, figure indicating whether or not the movements of said image input means is being controlled by a communication terminal connected to the network.

6. The apparatus according to claim 1, further comprising means for identifiably displaying, on said display unit, the communication terminal which is permitted to control the movements of said image input means.

7. An image transmission apparatus which is connected to a network and transmits/receives an image, comprising:
    a display unit;
    image input means for inputting an image;
    transmission means for transmitting the image input by said image input means onto the network; and
    notification means for notifying that the movements of said image input means are controlled by a communication terminal via the network, to the communication terminal which controls said image input means via the network,
    wherein said notification means notifies by using a tone.

8. The apparatus according to claim 7, further comprising terminal display means for identifiably displaying the communication terminal, which is controlling the movements of said image input means via the network, on said display unit.

9. An image transmission apparatus which is connected to a network and transmits/receives an image, comprising:
    a display unit;
    image input means for inputting an image;
    transmission means for transmitting the image input by said image input means onto the network;
    notification means for notifying that said transmission means is transmitting the image, and
    means for specifying a communication terminal connected to the network and requesting a control of the movements of an image input means of the communication terminal,
    wherein said notification means change a state of notification based on whether said transmission means is transmitting the image or the movements of said image input means are controlled.

10. The apparatus according to claim 9, wherein said image input means comprises a camera, and the operation control includes at least one control processing of pan processing, tilt processing, zoom processing, and focusing processing of said camera.

11. The apparatus according to claim 7, wherein said notification means change the state of notification by changing a frequency or tone volume of the tone.

12. An image transmission apparatus which is connected to a network and transmits/receives an image, comprising:
a display unit;
image input means for inputting an image;
transmission means for transmitting the image input by said image input means onto the network; and
notification means for notifying that the movements of said image input means are controlled by a communication terminal via the network, to the communication terminal via the network,
wherein said notification means notifies by using light.

13. The apparatus according to claim 12, wherein said notification means notifies by changing time intervals of turning on and off of the light and the intensity of the light.

14. The apparatus according to claim 7, further comprising observer display means for displaying information indicating a communication terminal, which is receiving the image transmitted by said transmission means, on said display unit.

15. The apparatus according to claim 7, further comprising display means for displaying an image received via the network on said display unit.

16. An image transmission method for an image transmission apparatus, which is connected to a network and transmits/receives an image, comprising the steps of:
inputting an image from a video camera, the movements of the video camera are able to be controlled via the network, by a communication terminal connected to the network;
transmitting the input image via the network; and
displaying information indicating the communication terminal which is controlling the movements of the video camera via the network.

17. The method according to claim 16, further comprising the steps of simultaneously displaying images received from a plurality of communication terminals via the network.

18. The method according to claim 16, further comprising the step of specifying a communication terminal connected to the network and requesting a control of the movements of a video camera of the communication terminal.

19. The method according to claim 18, wherein the operation control includes at least one control of pan processing, tilt processing, zoom processing, and focusing processing of the video camera.

20. The method according to claim 16, further comprising the step of displaying a figure indicating whether or not the movements of the video camera is being controlled by a communication terminal connected to the network.

21. The method according to claim 16, further comprising the step of identifiably displaying a communication terminal which is permitted to control the movements of the video camera.

22. An image transmission method for an image transmission apparatus, which is connected to a network and transmits/receives an image, comprising the steps of:
inputting an image from a video camera;
transmitting the input image via the network; and
notifying that the movements of the video camera are controlling by a communication terminal via the network, to the communication terminal via the network, wherein the notifying step notifies by using a tone.

23. The method according to claim 22, further comprising the step of identifiably displaying, on the display unit, the communication terminal which is controlling the movements of the video camera via the network.

24. An image transmission method for an image transmission apparatus, which is connected to a network and transmits/receives an image, comprising the steps of:
inputting an image from a video camera;
transmitting the input image via the network;
notifying that image transmission is being executed, and specifying a communication terminal connected to the network and requesting a control of the movements of a video camera of the communication terminal,
wherein in said notifying step, a notifying state is changed based on whether the input image is being transmitting or the movements of the video camera are controlled.

25. The method according to claim 24, wherein the operation control includes at least one control of pan processing, tilt processing, zoom processing, and focusing processing of the video camera.

26. The method according to claim 24, wherein the notification step notifies by changing a frequency or tone volume of the tone.

27. An image transmission method for an image transmission apparatus, which is connected to a network and transmits/receives an image, comprising the steps of:
inputting an image from a video-camera;
transmitting the input image via the network;
notifying that image transmission is being executed, and specifying a communication terminal connected to the network and requesting a control of the movements of a video camera of the communication terminal,
wherein the notification step further notifies that the movements of the video camera are controlled by a communication terminal via the network, by using light.

28. The method according to claim 26, wherein the informing step informs by changing time intervals of turning on and off of the light and the intensity of the light.

29. The method according to claim 22, further comprising the step of displaying, on a display unit, information indicating a communication terminal which is receiving the transmitted image.

30. The method according to claim 22, further comprising displaying an image received via the network on the display unit.

31. An image transmission system which transmits images picked up by video cameras connected to a plurality of terminal connected to a network among the terminals via the network, comprising:
storage means for storing information of a terminal which can receive an image transmitted from a first terminal;
transmission means for transmitting the image from the first terminal to a second terminal which can receive the image from the first terminal in accordance with the information stored in said storage means;
receiver display means for identifiably displaying the second terminal to which the image is being transmitted by said transmission means on a display unit of the first terminal;
display means for identifiably displaying a terminal, which is controlling the movements of the video camera connected to the first terminal, on said display unit of the first terminal;

informing means for informing whether or not the image from the first terminal is being displayed on another terminal, or whether or not the movements of the video camera of the first terminal are being controlled by another terminal.

32. The system according to claim 31, wherein each of the plurality of terminals comprises request issuing means for requesting another terminal to operate the video camera connected to the terminal.

33. The system according to claim 31, wherein each of the plurality of terminals comprises multi-point video display means for simultaneously displaying images from the plurality of terminals.

34. The system according to claim 31, wherein each of the plurality of terminals displays, on a display, an icon which allows to identify whether or not the image from the terminal is being displayed on another terminal or whether or not the video camera of the terminal is being operated by another terminal.

35. The system according to claim 31, wherein said informing means generates information by means of a tone, and changes the tone in correspondence with an operation state of the video camera.

36. An image transmission apparatus which is connected to a network and transmits/receives an image, comprising:

image input means for inputting an image signal, movements of said image input means are able to be controlled via the network by first communication terminal connected to the network; and notification means being capable of notifying a user on the side of second communication terminal which is connected to the image input means, that the movements of said image input means are controlled by said first communication terminal connected to the network.

37. The apparatus according to claim 36, wherein said notification means notifies by using a tone.

38. The apparatus according to claim 36, wherein said notification means notifies by using light.

39. An image transmission method, comprising the steps of:

inputting an image signal from a camera, movements of the camera are able to be controlled via a network by first communication terminal which is connected to the network; and notifying a user on the side of second communication terminal which is connected to the camera, that the movements of the camera are controlled by said first communication terminal connected to the network.

40. The method according to claim 39, wherein said notifying step notifies by using a tone.

41. The method according to claim 39, wherein said notification step notifies by using light.

* * * * *